US007876213B2

(12) United States Patent
Angelo et al.

(10) Patent No.: US 7,876,213 B2
(45) Date of Patent: Jan. 25, 2011

(54) PERSONAL ANNUNCIATION DEVICE

(75) Inventors: Peter Angelo, Oak Ridge, TN (US); James Younkin, Oak Ridge, TN (US); Paul DeMint, Kingston, TN (US)

(73) Assignee: Babcock & Wilcox Technical Services Y-12, LLC, Oak Ridge, TN (US)

( * ) Notice: Subject to any disclaimer, the term of this patent is extended or adjusted under 35 U.S.C. 154(b) by 526 days.

(21) Appl. No.: 12/040,248

(22) Filed: Feb. 29, 2008

(65) Prior Publication Data

US 2009/0219152 A1 Sep. 3, 2009

(51) Int. Cl.

| | |
|---|---|
| ***G08B 1/08*** | (2006.01) |
| ***G08B 23/00*** | (2006.01) |
| ***G08B 21/00*** | (2006.01) |
| ***G08B 5/22*** | (2006.01) |
| ***H04M 11/04*** | (2006.01) |

(52) U.S. Cl. .............................. 340/539.11; 340/573.4; 340/686.6; 340/539.23; 340/825.49; 340/7.58; 455/404.2

(58) Field of Classification Search .............. 340/572.1, 340/539.1, 539.11, 539.13, 539.17, 539.23, 340/573.1–573.6, 686.1, 506, 825.49, 286.01–286.14, 340/7.1–7.5; 455/404.1–404.2, 521, 456.1–458; 379/45; 725/33–35

See application file for complete search history.

(56) References Cited

U.S. PATENT DOCUMENTS

| | | | | |
|---|---|---|---|---|
| 5,732,326 | A * | 3/1998 | Maruyama et al. | 455/66.1 |
| 6,028,513 | A | 2/2000 | Addy | |
| 6,317,080 | B1 | 11/2001 | Baxter, Jr. | |
| 6,380,860 | B1 | 4/2002 | Goetz | |
| 6,411,207 | B2 | 6/2002 | Shaffer | |
| 6,452,490 | B1 | 9/2002 | Garland et al. | |
| 6,493,633 | B2 | 12/2002 | Baron, Sr. et al. | |
| 6,518,878 | B1 | 2/2003 | Skoff | |
| 6,630,892 | B1 | 10/2003 | Crockford et al. | |
| 6,693,539 | B2 | 2/2004 | Bowers et al. | |
| 6,703,930 | B2 | 3/2004 | Skinner | |

(Continued)

OTHER PUBLICATIONS

I-Team: Bracelet Promises Air Safety, At A Price, Jul. 21, 2008, cbs4.com, http://cbs4.com/iteam/security.bracelet.security.2.784127.html.

*Primary Examiner*—Benjamin C Lee
*Assistant Examiner*—Michael Shannon
(74) *Attorney, Agent, or Firm*—Michael J. Renner; Luedeka, Neely & Graham PC

(57) ABSTRACT

A personal annunciation device (PAD) providing, in an area of interest, compensatory annunciation of the presence of an abnormal condition in a hazardous area and accountability of the user of the PAD. Compensatory annunciation supplements primary annunciation provided by an emergency notification system (ENS). A detection system detects an abnormal condition, and a wireless transmission system transmits a wireless transmission to the PAD. The PAD has a housing enclosing the components of the PAD including a communication module for receiving the wireless transmission, a power supply, processor, memory, annunciation system, and RFID module. The RFID module has an RFID receiver that listens for an RFID transmission from an RFID reader disposed in a portal of an area of interest. The PAD identifies the transmission and changes its operating state based on the transmission. The RFID readers recognize, record, and transmit the state of the PAD to a base station providing accountability of the wearer.

24 Claims, 11 Drawing Sheets

U.S. PATENT DOCUMENTS

| | | | | |
|---|---|---|---|---|
| 6,710,711 | B2 | 3/2004 | Berry | |
| 6,710,715 | B2 | 3/2004 | Deeds | |
| 6,832,251 | B1 | 12/2004 | Gelvin et al. | |
| 6,853,303 | B2 | 2/2005 | Chen et al. | |
| 6,992,580 | B2 | 1/2006 | Kotzin et al. | |
| 7,307,522 | B2 | 12/2007 | Dawson | |
| 2002/0050932 | A1* | 5/2002 | Rhoades et al. | 340/870.16 |
| 2002/0174367 | A1 | 11/2002 | Kimmel et al. | |
| 2002/0175811 | A1 | 11/2002 | Merrell et al. | |
| 2003/0006903 | A1 | 1/2003 | Naegely et al. | |
| 2003/0023874 | A1* | 1/2003 | Prokupets et al. | 713/201 |
| 2003/0067386 | A1* | 4/2003 | Skinner | 340/540 |
| 2003/0119568 | A1 | 6/2003 | Menard | |
| 2003/0141977 | A1 | 7/2003 | Brown et al. | |
| 2004/0135684 | A1 | 7/2004 | Steinthal et al. | |
| 2004/0135699 | A1 | 7/2004 | Salzhauer et al. | |
| 2004/0137959 | A1 | 7/2004 | Salzhauer et al. | |
| 2004/0203343 | A1 | 10/2004 | Schropp et al. | |
| 2004/0229590 | A1 | 11/2004 | Kubo et al. | |
| 2005/0001720 | A1* | 1/2005 | Mason et al. | 340/539.13 |
| 2005/0074023 | A1 | 4/2005 | Wall | |
| 2005/0275530 | A1* | 12/2005 | Kates | 340/539.22 |
| 2006/0077253 | A1 | 4/2006 | VanRiper et al. | |

* cited by examiner

PERSONAL ANNUNCIATION DEVICE

GOVERNMENT RIGHTS

The U.S. Government has rights to this invention pursuant to contract number DE-AC05-00OR22800 between the U.S. Department of Energy and Babcock & Wilcox Technical Services, LLC.

FIELD

This disclosure relates to the field of personnel safety. More particularly, this disclosure relates to a personal annunciation device for providing hazard location, compensatory annunciation for alerting personnel to the presence of an abnormal condition in a hazardous area, and accountability of individuals in areas of interest.

BACKGROUND

Many industrial and commercial plants and government and private research and industrial facilities perform potentially dangerous processes. Automated warning and alarm systems alert personnel to dangerous or abnormal conditions inside or near a plant so that the personnel may take prompt protective action such as evacuation, co-location or shelter in place. Such automated systems include simple fire and smoke detectors that detect the presence of fire or smoke and immediately activate a connected, audible alarm confined to a specific area of a plant. Many systems include a central hub for receiving detection signals from a plurality of detectors for detecting a plurality of different hazards located throughout a plant. In some systems the central hub also is connected to a network of alarms including audible alarms, both siren-like and information-based, and visual alarms, including flashing emergency lights and textual-based information screens.

Unfortunately, in some environments, currently-available automated warning and alert systems are not entirely effective. For example, they may not provide complete notification coverage over a wide area, or they may not provide for personal accountability during an emergency alert. What are needed therefore are improved systems for alerting persons of impending or actual hazardous conditions that could endanger their safety.

SUMMARY

The present disclosure provides an emergency notification system (ENS) for annunciating in an area of interest in the presence of an abnormal condition in a hazardous area. Typically the ENS has a detection network that is configured for detecting an abnormal condition in a hazardous area and producing an information signal indicating the presence of the abnormal condition, and configured for processing the information signal and communicating a transmission input signal based at least in part on the information signal. The ENS also generally includes a transmission terminal that is configured for receiving the transmission input signal and for communicating a transmission control signal based at least in part on the transmission input signal and recognition of detector alarm states for detectors deployed in specific locations. Also typically provided is a transmission interface that is configured for receiving the transmission control signal from the transmission terminal and transmitting a wireless transmission based at least in part on the transmission control signal. The ENS also usually provides a personal annunciation device (PAD) that is configured for self-arming into an armed state when moving into the area of interest and self-disarming into a disarmed state when moving out of the area of interest and configured for receiving the wireless transmission and annunciating the presence of the abnormal condition only when located within the area of interest based at least in part on the received wireless transmission and configured for performing a self-check and alerting when located within the area of interest, the PAD having a unique identification for transmittal to a base station when the PAD is transitioned to self-armed and when the PAD is transitioned to self-disarmed. The ENS also typically includes an RFID reader that is configured for recognizing the state of the PAD and causing the PAD to self-arm into the armed state when moving into the area of interest and self-disarm into the disarmed state when moving out of the area of interest.

Another embodiment provides a personal annunciation device (PAD) for providing in an area of interest compensatory annunciation of the presence of an abnormal condition in a hazardous area, the compensatory annunciation being in addition to primary annunciation provided by an emergency notification system (ENS). In one embodiment the PAD includes a housing that is configured for enclosing the PAD, and a power supply that is configured inside the housing and configured for providing power to the PAD. In this embodiment the PAD also includes a radio frequency identification device (RFID) module that is configured for receiving an RFID transmission and for communicating an RFID signal and a processor module that is configured for receiving the RFID signal and performing a state change algorithm for switching the PAD between an armed state in which the PAD will annunciate and a disarmed state in which the PAD will not annunciate. Further in this embodiment the PAD includes a communication module that is configured for receiving a wireless transmission from a wireless transmission system and communicating annunciation information to the processor module based at least in part on the wireless transmission, wherein the processor module is further configured for receiving the annunciation information and communicating a first annunciation control signal based at least in part on the annunciation information. In this embodiment the PAD also has an annunciation module that is configured for receiving the first annunciation control signal and for providing annunciation corresponding to the first annunciation control signal.

Also provided is a method for providing in an area of interest compensatory annunciation indicating the presence of an abnormal condition in a hazardous area, the compensatory annunciation in addition to primary annunciation provided by an emergency notification system (ENS). The method generally includes a step of receiving with a personal annunciation device (PAD) a radio frequency identification device (RFID) transmission from an RFID reader disposed in or near a portal of the area of interest. In a further step of this embodiment the method provides for determining whether the PAD is entering the area of interest based at least in part on the received RFID transmission, and then changing an operating state of the PAD from a disarmed state to an armed state if the PAD is entering the area of interest. In this embodiment the method also includes a step of receiving a wireless transmission with the PAD in the armed state from a paging system of the ENS and providing compensatory annunciation to the user based on the received wireless transmission.

BRIEF DESCRIPTION OF THE DRAWINGS

Further advantages of the disclosure are apparent by reference to the detailed description when considered in conjunction with the figures, which are not to scale so as to show more clearly the details, wherein like reference numbers indicate like elements throughout the several views, and wherein.

DETAILED DESCRIPTION

Figure 1:
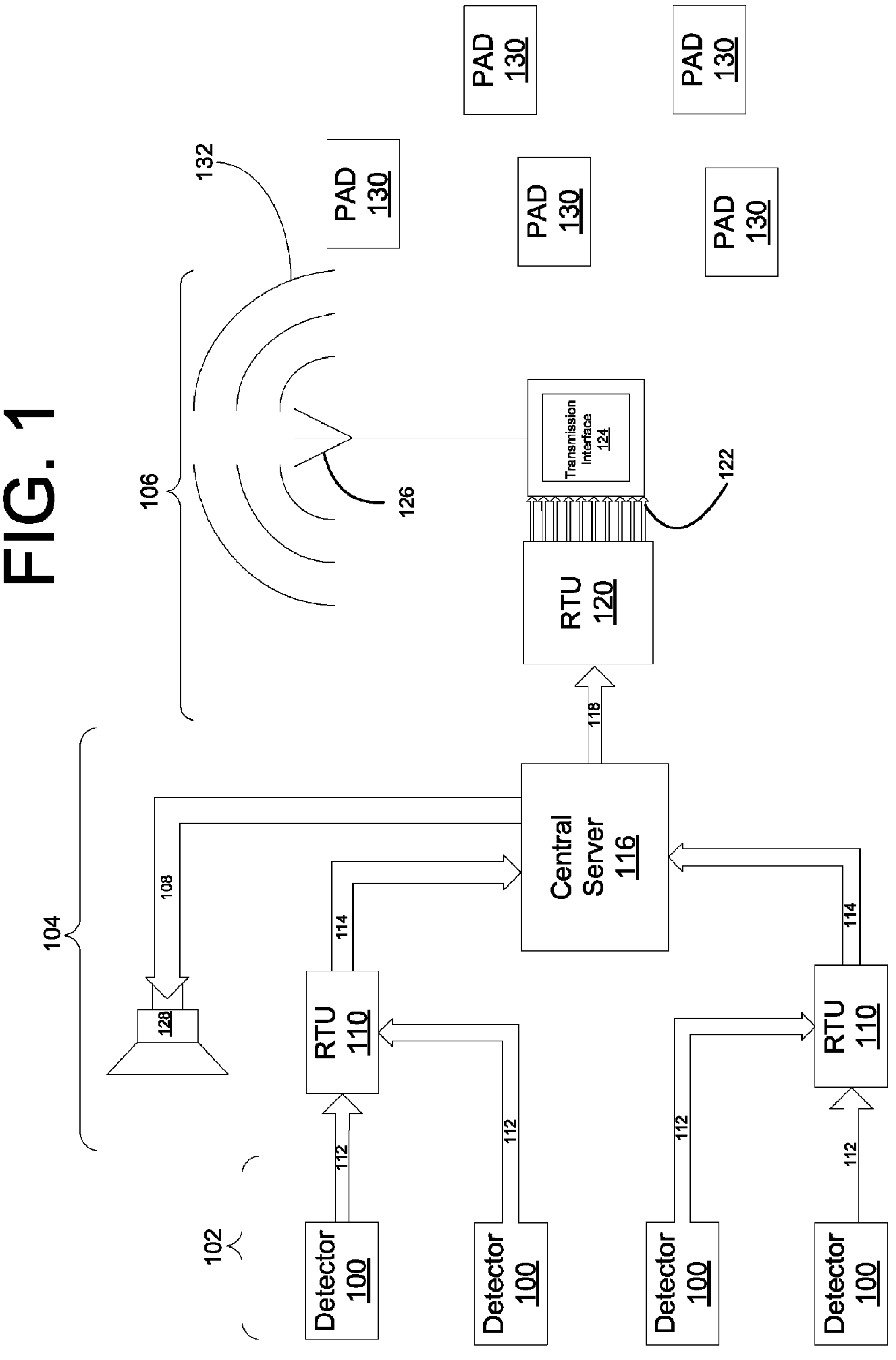
FIG. 1 is a diagrammatic view of an emergency notification system according to the disclosure having a detection system and a wireless transmission system with a transmission interface for wirelessly communicating with a plurality of PADs.

In the following detailed description of the preferred embodiments, reference is made to the accompanying drawings, which form a part hereof, and within which are shown by way of illustration the practice of specific embodiments of an emergency notification system (ENS) for annunciating in an area of interest in the presence of an abnormal condition in a hazardous area, and embodiments of a personal annunciation device (PAD) for providing in an area of interest compensatory annunciation of the presence of an abnormal condition in a hazardous area, the compensatory annunciation in addition to primary annunciation provided by an emergency notification system (ENS) and embodiments of a method for providing in an area of interest compensatory annunciation indicating the presence of an abnormal condition in a hazardous area, the compensatory annunciation in addition to primary annunciation provided by an emergency notification system (ENS). It is to be understood that other embodiments may be utilized, and that structural changes may be made and processes may vary in other embodiments.

To understand the relevance and importance of various embodiments described herein it is helpful to understand the nature, scope and desirable features of various elements of systems that may be used to notify people of a potential or actual hazardous condition. Many notification systems include a network of detectors installed throughout the buildings of a complex and such a network is referred to as a detection network. The purpose of these detectors is to detect a hazardous condition in a particular location that would require prompt protective action. Detectors may be located throughout the complex and may be networked via connections to Remote Terminal Units (RTUs), which are typically computer stations configured for receiving and relaying location-dependent detection signals to a central server or servers. The combination of the RTUs, central server(s), detectors, and fixed, permanently installed horns and lights are part of an automated warning and alert system. The automated warning and alert system provides the alerting mechanism for a wide variety of hazards in different embodiments, including but not limited to chemical spills, inclement weather conditions, and fire. Regarding a fire alert, for example, the automated warning and alert system receives detection signals, processes the detection signals and controls alarm indicators such as audible and visual alarms like speakers, horns and lights.

When an automated warning and alert system sounds an alarm, the location of the hazard is generally known in an emergency control room or other specific emergency response area, but it is important that the location of the hazard is also known by many other people who need to know that information, including those in close proximity to the hazard. It is also very helpful if individuals in a control room where first responder actions are coordinated are able to identify the whereabouts of specific individuals who may be incapacitated by the hazard. Additionally, it is helpful if the automated warning and alert system gives an indication of the nature or character, and the specific location, of the hazard, so that emergency response personnel have such information regarding the accident or abnormal condition readily available. Also, it is helpful if the automated warning and alert system provides a means by which to account for the presence or absence of individuals in these areas since it is highly desirable to account for all individuals in potentially hazardous areas within a brief time following the detection of the hazard.

Another consideration in the design of automated warning and alert systems is that there may be various areas in and around the facility where audio and visual alarm systems are ineffective because of a high level of auditory noise in the environment. This may be due to machinery or other plant operations. To compensate for such conditions, personal detection and alerting devices may be used to augment the annunciation provided by the automatic warning and alert system in areas of concern, such as those where audible alarms are ineffective. Annunciation supplementary to the annunciation provided by the automatic warning and alert system is referred to as compensatory annunciation.

A further desirable feature of a personal detection and alerting system is that it be configured to annunciate when the automatic warning and alert system detects a hazardous condition when the person wearing the personal device is located within the region of the hazardous condition. It is also desirable that the personal detection and alerting system be configured to notify individuals requiring notification who are in areas that are not necessarily identical to the areas within the region of the hazardous conditions, such as in an emergency response center.

Additionally, although some personal devices include a vibration feature, it is helpful if the devices are equipped with remote arming (activation by remote control) of vibration alarming to ensure adequate annunciation. To provide a further means of notification, personal detection and alerting devices may be configured with light emitting diode (LED) extensions affixed to the eyeglasses in the line of sight of a wearer. Such devices should be kept light in weight, unobtrusive in appearance, and also capable of remote arming.

Hazards, of course, are found in many forms including, fire, chemical discharges, biological dispersions, and environmental hazards (e.g., tornadoes, lightning, and other weather conditions). Therefore, a personal annunciation device should provide personnel notification for various and multiple types of hazards.

Some portable annunciation devices such as commercially available pagers require users to activate, that is, to turn on the devices as the user enters an area of interest or a hazardous area. Herein, the phrase "area(s) of interest" refers to area(s) or location(s) where emergency notification and/or personnel accountability is necessary, and the term "hazardous area(s)" refers to area(s) or location(s) where a hazard is present. An area of interest includes at least one hazardous area.

It should be noted that reliance on the user to ensure an annunciation device is activated introduces an inherent human error component, namely, that the user may forget to power-on their portable annunciation device when entering a hazardous area or, more globally, when entering a portion of a facility that may become an area of interest if a hazard condition develops in the facility. Hence, it is desirable to provide a personal annunciation device with a feature that can be automatically turned on when a person enters such areas. It is also desirable to provide a personal annunciation device that turns off automatically when a person leaves such areas in order to preserve battery life.

In summary, it is very beneficial that a personal annunciation device for an ENS be assuredly powered-on and has sufficient battery power and signal strength when present in an area of interest or a hazardous area. The compensatory annunciation provided by the personal compensatory annunciation device should be designed to overcome annunciation obstacles such as high environmental noise, construction activities, or any extremely loud areas of a building located within areas of interest or hazardous areas that require immediate notification and/or personnel accountability. Additionally, the compensatory annunciation device should be reliable and designed to be human error-free so that personnel are substantially uninvolved in its maintenance and generally unencumbered by wearing it. Finally, it is very beneficial from a cost perspective if the compensatory annunciation device can utilize an existing event detection and alert system already in place and is sufficiently robust so that additional detection systems, such as compensatory portable hazard detector instruments or any other portable instrumentation, are unnecessary.

The above and other objectives may be met at least in part by various embodiments of a personal annunciation device (PAD) described herein that provides compensatory annunciation to an individual located in an area of interest. The PAD is typically configured to provide annunciation to all individuals inside an area of interest, which is an area that may be larger than or distinct from, the hazardous area. This potential annunciation outside the immediate hazardous area (but within the area of interest) is beneficial because personnel must be aware of the hazard and its location so that they may respond accordingly. Furthermore, since the relative location of each PAD may be assumed to indicate the location of the associated user, the PAD provides ready accountability of the location of all personnel in an area of interest or a hazardous area.

In one embodiment, an emergency notification system (ENS) has a detection network, a central server, a remote terminal unit, a wireless transmission interface, and at least one PAD. The central server receives an information signal from the detection network, the information signal indicating the presence of the abnormal condition, and the central server processes the information signal.

Then, the central server communicates a transmission input signal based at least in part on the information signal to a wireless transmission system. The wireless transmission system is typically a computer-based wireless communication system that includes a modified RTU as a transmission terminal for receiving the transmission input signal and for communicating a transmission control signal based at least in part on the transmission input signal. A transmission interface is typically connected to the modified RTU transmission terminal for receiving the transmission control signal and transmitting a wireless transmission based at least in part on the transmission control signal. A PAD receives the wireless transmission when operating in an armed state.

The emergency notification system typically contains a plurality of alarm processors that are interfaced to the central server. Each alarm processor contact is linked uniquely to a central server relay such that a minimum time between detection of a hazardous condition and transmission of the wireless transmission may be provided.

In some embodiments, the wireless transmission system uses a paging protocol that serves as the transmission protocol. However, the use of a specific paging protocol is not required. For example, Transmission Control Protocol/Internet Protocol (TCP/IP) may be used over a wireless fidelity (WIFI) local area network. In such embodiments the PAD may be internet addressable. In another embodiment, a direct wireless transmission protocol may be used for the transmission of the wireless transmission. One such protocol is the Common Alerting Protocol (CAP). The CAP utilizes Extensible Markup Language (XML) that facilitates the sharing of information across multiple networks. The CAP provides for an XML-based format for exchanging public warnings and alerts among various warning technologies. CAP allows a warning message to be consistently disseminated simultaneously over many different warning systems to many different applications. The CAP has the potential for flexible geographic targeting and geospatial representations in three dimensions.

The PAD has a radio frequency identification (RFID) device for receiving an RFID transmission, a communication module to receive a wireless transmission, and a processor module programmed to provide concurrent alerts of fixed duration. The communication module operates in a range that allows transmission through many environments and obstacles. The RFID is embedded within the PAD circuitry hardware, and is connected to the communication module and processor module within the PAD. The RFID is used to automatically arm or disarm the PAD without intervention by the user (such as turning the PAD on). An external transmission device (referred to as an "RFID reader") with RFID recognition circuitry is used to recognize the state of the individual PAD receiver, that is, whether the PAD is in an armed state (wherein the PAD is "ON") or in a disarmed state (wherein the PAD is "off"). If the PAD is in the armed state, the RFID reader automatically disarms the PAD using an RFID receiver embedded in the PAD. If the PAD is in a disarmed state, the RFID reader automatically arms the PAD using the RFID receiver embedded in the PAD. In other words the RFID reader inverts that status of the PAD whenever the PAD passes by the RFID reader; if the PAD is OFF the RFID reader turns the PAD on, if the PAD is ON, the RFID reader turns the PAD OFF. These processes result in changes in the operational states for the PAD that are referred to herein as being transitioned to "self-armed" when the PAD is turned from OFF to ON and as being transitioned to "self-disarmed" when the PAD is turned from ON to OFF.

Usually the PAD is armed by passing through a portal such as a doorway that incorporates the RFID reader. One such RFID reader is a card manufactured by Atmel Corporation of San Jose Calif. However, the PAD may also be armed by a table top RFID reader that is housed within a simple box housing. Individual RFID readers may be provided at specific locations within an area. Thus, as the user of the PAD passes into and out of an area of interest, the RFID readers arm and disarm the PAD respectively. The RFID readers recognize, record, and transmit information indicating the identification of the PAD to a base station. This provides information indicating the state of the PAD and general user location.

Once the PAD is armed or disarmed by passing through a portal equipped with an RFID reader, the state of the specific PAD is transmitted to a central base station. Each individual PAD is coded with a unique identification in firmware such that the location of an individual user of a particular PAD is determined. In another embodiment, the specific PAD identification information and other information is transmitted by an "active RFID" within the PAD to the RFID reader. Thus, as the individual enters or exits an area of interest, the PAD status and hence, the location of the user, may be inferred. For example, if the PAD switches from an armed state to a disarmed state upon passing through a portal, it is inferred that the user and the PAD have just moved outside the area of interest. Although the PAD does not provide exact Cartesian coordinate (e.g., specific x, y, z) location, it may be used for a more general area accountability (e.g., on a particular building floor or area) during an emergency alert.

In some embodiments, once the PAD is armed, the communication module is cycled between a listening mode and a sleeping mode. The sleeping mode refers to a power saving mode that extends the lifetime of the PAD power supply. The listening mode refers to a mode for receiving wireless transmissions from the wireless transmission system. The listening mode and the sleeping mode are cycled by the processor module and firmware programming. The listening mode provides the time window for decoding any alert message signals that arise from a wireless transmission. The period of the listening mode is of small duration but is of sufficient time that any wireless transmission may be recognized and received.

When the user wearing the PAD is exiting an area of interest, the PAD disarms and does not "listen" for wireless transmissions. In other embodiments, the PAD may be in an armed state while outside an area of interest, but have an inactive mode where it listens for the RFID reader and the wireless transmission, but does not annunciate (or does not annunciate fully) in response to the wireless transmission. When the PAD is in a disarmed state, outside the area of interest, it consumes only the small amount of power necessary for its RFID module to operate and "listen" for RFID readers. Thus the lifetime of the PAD is predicated on disarming the PAD as it exits an area of interest and cycling between the sleeping mode and the listening mode.

In a "one RFID system," the PAD knows it is entering an area of interest when it receives an RFID transmission from an RFID reader, and the PAD changes from a disarmed state to an armed state. Upon receiving an RFID transmission from the specific RFID reader a second time, the PAD knows it is exiting the area of interest and changes from the armed state to the disarmed state.

In an alternate embodiment with a "two RFID system," two RFID readers are stationed somewhat distal from each other along a path of entry and egress through a portal of an area of interest. The RFID reader that is first encountered along the path into the area of interest along the path is arbitrarily referred to here as the "first" RFID reader and the RFID reader that is later encountered along the path into the area of interest is arbitrarily referred to here as the "second" RFID reader. The PAD knows it is entering an area of interest if it receives a second (later) RFID transmission from the second RFID reader within a predetermined time period of receiving a first (earlier) RFID transmission from the first RFID reader. Similarly, the PAD knows it is exiting an area of interest if it receives a second (later) RFID transmission from the first RFID reader within a predetermined time period of receiving a first (earlier) RFID transmission from a second RFID reader. In another embodiment of a two RFID system, two RFID readers are stationed adjacent each other along a path of entry and egress through a portal of an area of interest. One RFID reader, arbitrarily referred to as the first RFID reader, is used to disarm PADs that pass by and the second RFID reader is used to arm PADs that pass by. The PAD receiver changes from a disarmed state to an armed state upon receiving a first RFID transmission from the first RFID reader and changes from the armed state to a disarmed state upon receiving a second RFID transmission from the second RFID reader. Because the two RFID readers are adjacent each other only one of the two readers acts on each PAD that passes by, inverting its ON/OFF state.

When the PAD is armed, the radio receiver is "listening" for any paging communication and the RFID module is "listening" for any RFID transmission. On the other hand, when the PAD is disarmed, it is in a minimally functional state where it does not listen for a wireless transmission but does, however, listen for an RFID transmission.

The PAD also has a housing enclosing the components of the PAD and a power supply embedded inside the housing for providing power to the PAD. In one embodiment, the PAD does not have a user interface and the components of the PAD are completely sealed in the housing. In another embodiment, the PAD housing has a button for a distress which may be transmitted depending on the type of RFID used. The distress function is only activated when an actual emergency condition exists.

A processor module receives an RFID signal from the RFID module and performs a state change algorithm, which is saved in a memory of the PAD as firmware. The firmware also contains a specific PAD identification number such that the state of a specific PAD in a specific location may be ascertained. A communication module receives a wireless transmission, corresponding to an information signal from a detection network, from the wireless transmission system and communicates annunciation information to the processor module based on the alarm processor associated with the wireless transmission. The processor module receives the annunciation information and communicates annunciation control signals to the annunciation module, which in some embodiments has a display module for visual annunciation including location of the specific detector actuated, an audio module for audible annunciation, and a vibration module for vibration annunciation.

A personal annunciation device (PAD) provides compensatory annunciation for an emergency notification system (ENS). Compensatory annunciation is annunciation over and above annunciation typically provided by an ENS. The PAD is a portable, light-weight, wireless device for receiving a wireless transmission such as a paging transmission and alerting a user of the presence of an abnormal condition via a concurrent display, audible alarm, and vibration. In one embodiment, the PAD remains in a disarmed state until its radio frequency identification device (RFID) module receives an identified transmission from an RFID reader disposed, for example, in a portal to an area of interest to arm the device. The PAD then powers-up to an armed state and alternates between a sleeping and a listening mode while in the armed state, which includes listening for a wireless transmission, while present in the area of interest. The duration between sleeping and listening modes while the device is armed may be several seconds to preserve battery life while the PAD is in the armed state. When the RFID module receives another identified transmission as the PAD exits an area of interest through the same or another portal, it returns to a disarmed state, in which the PAD does not listen for a wireless transmission but continues to listen for an RFID transmission from an RFID reader. In some embodiments, two RFID readers are used to indicate passage from one area of interest to another area of interest or non-area of interest or vice versa. One and two RFID configurations are discussed with reference to FIG. 5. The state change algorithm, whereby the PAD changes from an armed state to a disarmed state and vice versa, is discussed herein with reference to FIG. 2B.

In order for a PAD to receive and annunciate information related to the detection of an abnormal condition, it must be armed, which is accomplished as the PAD is moved through a portal into an area of interest as further described below. The area of interest may be the same as the hazardous area throughout which the detector network is distributed. Alternatively, the area of interest may be distinct and outside of the hazardous area. Typically, the area of interest includes all of the hazardous area in addition to areas not included in the hazardous areas. For example, a building is deemed a hazardous area and a detector network is distributed throughout the building. Typically, a hazardous area is also included in the area of interest. In addition, the areas outside the building for several hundred feet are included in the area of interest. Such areas of interest, as discussed above, require annunciation in the event of the presence of a hazardous condition in the hazardous area. In such cases, portals where RFID readers are disposed must be strategically located in order to ensure personnel entering and exiting the areas of interest must pass through a portal. This is because the PAD performs a state change algorithm, as discussed with reference to FIG. 2B below, and runs in an armed state with an alternating sleep-listening mode once having entered an area of interest. In outdoor areas of interest this may be difficult, but structures such as a fence may be used to cordon off outdoor areas of interest and provide portals where RFID readers are located.

The armed state, in some embodiments, is displayed on the PAD during times when the PAD is armed and able to receive alarm signals included in wireless transmissions from the wireless transmission system.

Referring now to FIG. 1, a diagram of a detection network 102 and ENS 104 having a wireless transmission system 106, such as a paging system, for wirelessly communicating with a plurality of PADs 130 is shown. ENS 104 includes the detection network 102 and the wireless transmission system 106 in some embodiments. The detection network 102 typically has a plurality of detectors 100 that are strategically located throughout a potentially hazardous area to ensure sufficient detection coverage. In one application of this embodiment, the detection network 102 is a nuclear radiation detection system, and each detector 100 is a radiation detector that communicates with a Remote Terminal Unit (RTU) 110 of the ENS 104. In other embodiments, the detectors 100 are chemical, biological or other type of detector or warning system input (such as tornado, tsunami, earthquake or lightning). The RTUs 110 receive detection signals 112 from the detectors 100 and communicate with a central server 116.

Typically, when a detector 100 generates a detection signal 112 indicating the presence of an abnormal condition, the RTU 110 communicates to the central server 116 an information signal 114 corresponding to the detection signal 112. Next, the central server 116 determines the proper course of action in response to receiving the information signal 114. If necessary, the central server 116 communicates an alarm signal 108 to one or more alarm indicators 128 such as a speaker, horn or siren, or emergency lights or textual displays and the like. Unfortunately, alarm indicators 128 may be ineffective in certain locations within the area of interest (in which the PAD is armed) and the hazardous area (in which the detection network 102 is disposed), such as areas where audible alarms are overwhelmed by plant noise. In such environments, compensatory annunciation is necessary and is provided by one or more of the PAD 130.

The central server 116 of the ENS 104 communicates with each PAD 130 over the wireless transmission system 106. The central server 116 sends a transmission input signal 118 to the wireless transmission system 106, which identifies the transmission input signal 118, corresponding to a detection signal 112, and sends a wireless transmission 132 on an immediate priority basis. More specifically, the wireless transmission system 106 sends a wireless transmission by receiving the transmission input signals 118 from the central server or multiple central servers 116 at transmission terminal RTU 120, which is a modified ENS RTU 110, determining which transmission input signal 118 indicates the earliest actuation of one of the detectors 100, and sending a transmission control signal 122 indicating the first actuated detector 100 to the transmission interface 124. The transmission interface 124 wirelessly transmits a wireless transmission 132 based on the transmission control signal 122 via antenna 126 to the plurality of PADs 130, and the PADs 130 sound an alarm, flash or display, and visually or audibly indicate which detector 100 sounded the first alarm and which particular detector 100 is in alarm.

In this embodiment, nine (9) transmission control signals and one (1) test signal make up the transmission control signals 122 and are sent from transmission terminal RTU 120 to transmission interface 124. The nine (9) transmission control signals may be a combination of different detector inputs, associated with a variety of hazard conditions (e.g., radiation, chemical, tornado, earthquake, and lightning). In some embodiments, multiple transmission terminal RTUs 120 are located at various buildings or portions of a facility and each receives a transmission input signal 118, if necessary, from a central server 116. In some embodiments, each transmission terminal RTU 120 is connected to a separate transmission interface 124 for a specific building or portion of the facility. In other embodiments, one transmission interface 124 is disposed in such a location that provides transmission coverage for the entire facility.

As described previously, the wireless transmission system 106 may be a paging system. Although the word "paging" is used herein in connection with the wireless transmission system 106, it should be understood that other types of wireless transmission systems 106 may be used.

Figure 2A:
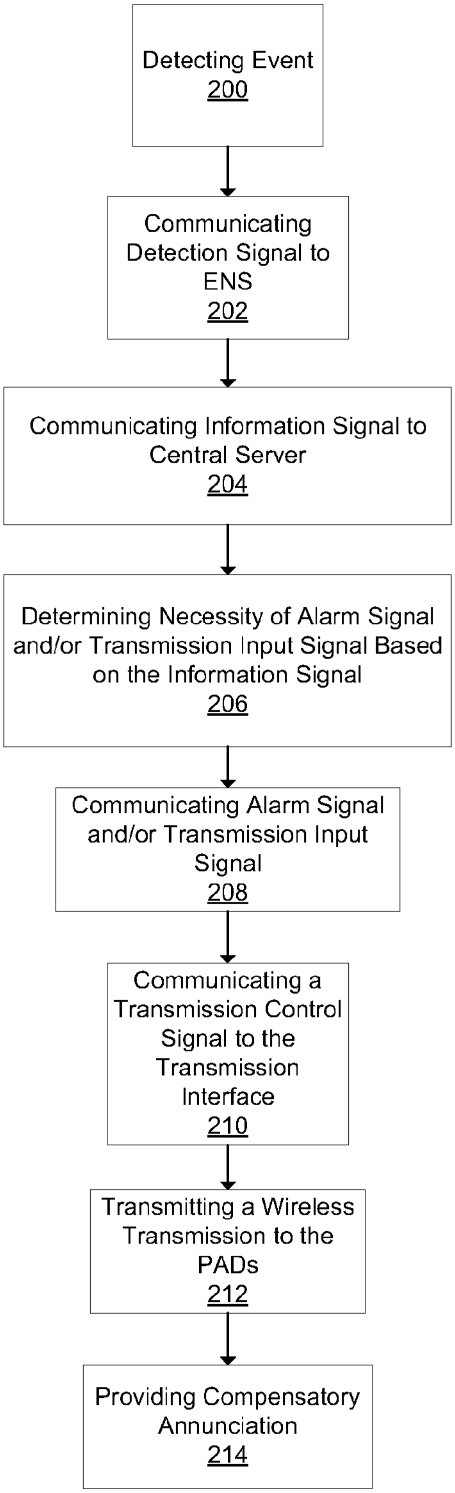
FIG. 2A is a flowchart showing steps taken between detection of an event or abnormal condition and annunciation by a PAD in an emergency notification system according to the disclosure.

Referring now to FIG. 2A, a flowchart showing steps taken between detector 100 actuation and compensatory annunciation by the PAD 130 is shown. First, as represented by block 200, the first step is detecting an event, which refers to detecting an abnormal condition such as an unusually high amount of radiation. As discussed regarding FIG. 1 above, detectors 100, which are part of a detector network 102, are distributed carefully throughout a facility. The detectors 100 communicate a detection signal to RTUs 110 of the ENS 104 as represented by block 202. ENS RTUs 110 communicate information signals 114 to a central server 116 as represented by block 204. Then, the central server 116 determines whether to send an alarm signal 108 to an alarm indicator 128 and/or a transmission input signal 118 to the transmission system 106 as represented by block 206. This determination is based on the information signals 114 received from RTUs 110. Next, the alarm signal 108 and/or the transmission input signal 118 are communicated by the central server 116 to the alarm indicators 128 and the transmission system 106 transmission terminal RTU 120 as represented by block 208. The transmission input signal 118 is received by the transmission terminal RTU 120, which communicates a transmission control signal 122 to the transmission interface 124 as represented by block 210. Next, the wireless transmission 132 is transmitted by the transmission interface 124 through antenna 126 as represented by block 212. Finally, a PAD 130 receives the wireless transmission 132 and provides compensatory annunciation as represented by block 214.

The wireless transmission 132 may include information indicating the location of the detector(s) 100 detecting an event such as a digit or number indicating the building. Furthermore, the wireless transmission 132, in one embodiment, indicates the first detector 100 in time communicating a detection signal. The determination of which detector 100 actuation occurred first in time is made by the central server 116 upon receiving information signals 114 from RTUs 110. Alternatively, data regarding the detector 100 actuations is included in the transmission input signal 118, and transmission terminal RTU 120 makes a determination of which detector 100 actuation occurred first in time. Thus, once determined, the transmission control signal 122 includes data indicating the location of the detector 100 that first communicated a detection event to the ENS 104, such as a digit indicating the building number. Next, the transmission interface 124 transmits the wireless transmission 132 as represented by block 206. Alternatively, the wireless transmission 132 transmitted by the transmission interface 124 may include test information used to test the operation of the wireless transmission system 106 and the response of PADs 130.

Figure 2B:
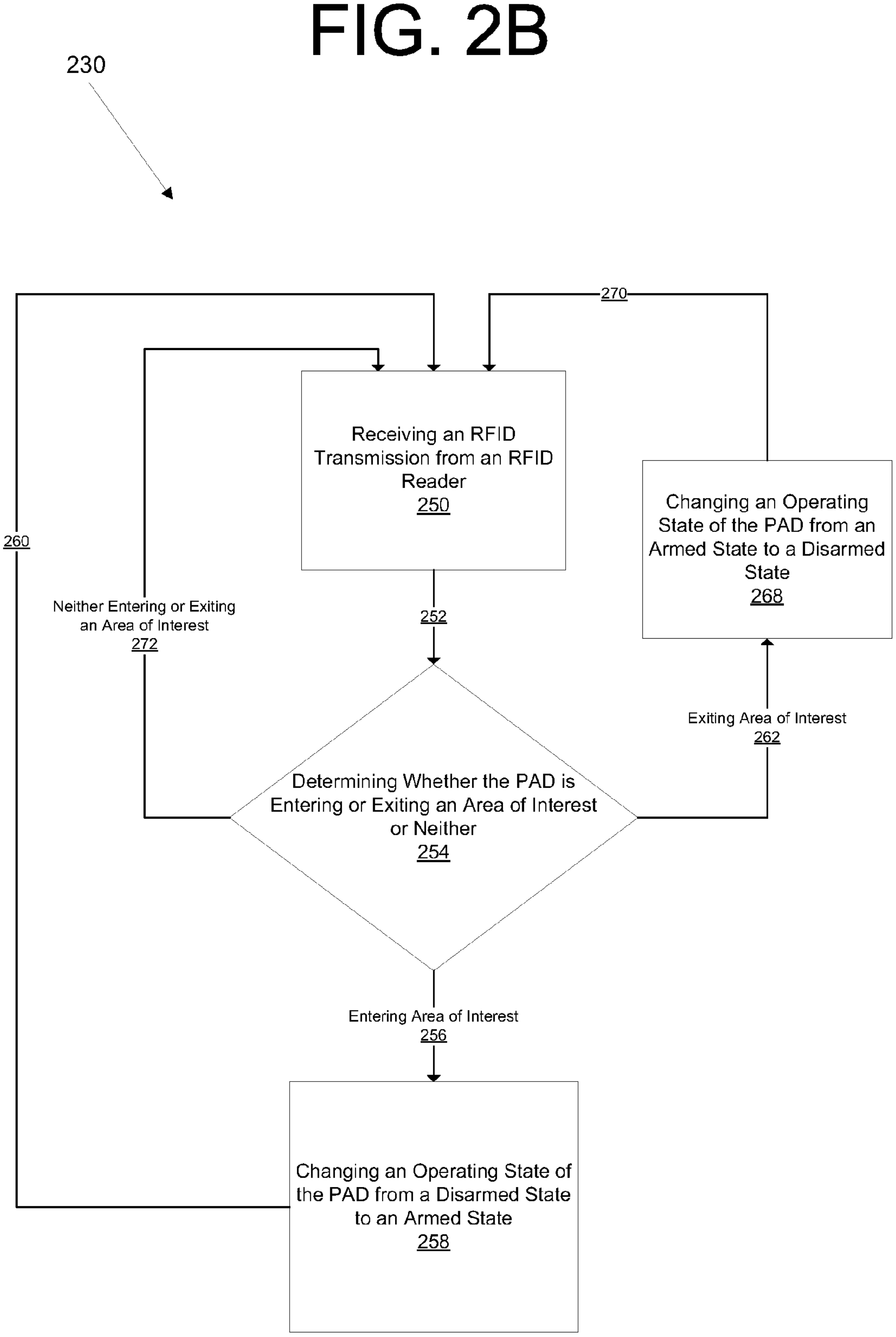
FIG. 2B is a flowchart representing a state change algorithm of a PAD according to the disclosure.
Figure 3:
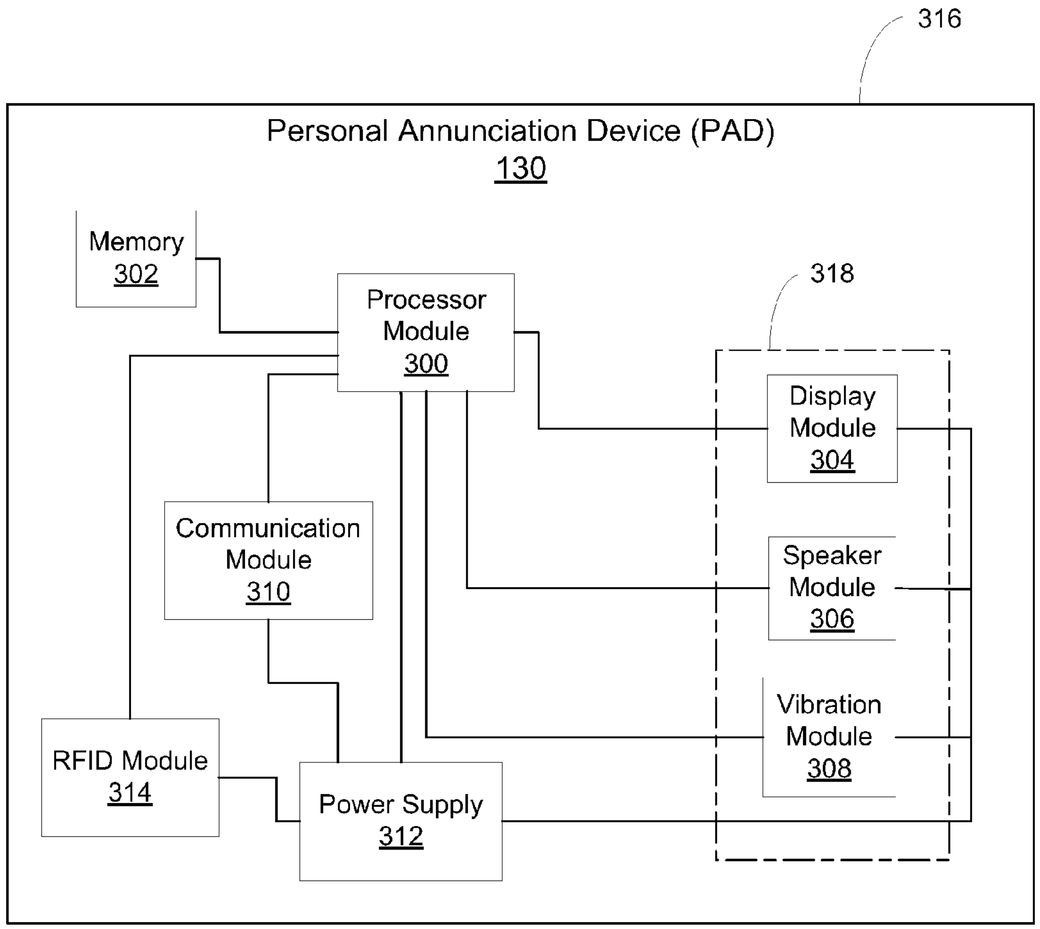
FIG. 3 is a block diagram of a PAD according to the disclosure.

Referring now to FIG. 2B, a flowchart representing the state change algorithm 230 of the PAD 130 is shown. The state change algorithm 230 is initiated when the PAD 130 receives an RFID transmission from an RFID reader as represented by block 250. RFID readers are disposed in or near every portal to an area of interest. The RFID receiver (part of the RFID module 314 of FIG. 3) receives the RFID transmission and communicates an RFID signal (represented by arrow 252 of FIG. 2B) to the processor module 300 (FIG. 3). The processor module 300 determines whether the PAD 130 is entering or exiting an area of interest or neither as represented by decision block 254 as further discussed with reference to FIG. 5 below.

The processor module 300 may also determine that the PAD 130 is neither entering nor exiting an area of interest. In this case the PAD 130 does not change modes. This determination to not invert the state of the PAD may be the result of receiving an RFID transmission from an RFID device not associated with the ENS 104. For example, RFID transmitters are increasingly used in commercial environments such as grocery stores and on factory floors. If the PAD 130 receives an RFID transmission from an RFID transmitter not associated with the ENS 104, the mode change algorithm 230 follows 272 and the PAD 130 continues to listen for RFID transmissions if the PAD was in the ON state and the PAD 130 remains in the OFF state if it was in the OFF state.

If the processor module 300 determines the PAD 130 is entering an area of interest (as discussed with reference to FIG. 5 below), the state change algorithm 230 follows arrow 256 to block 258, which represents changing the operating state of the PAD 130 from a disarmed state to an armed state. When the PAD 130 is armed, its communication module 310 (FIG. 3) is operating in an alternating sleeping-listening mode to conserve power. When the PAD 130 is operating in the armed state the RFID module 314 (FIG. 3) is operational and listening for an RFID transmission. In some embodiments, the RFID module 314 also alternates between a sleeping and listening mode wherein it "wakes-up" to listen for an RFID transmission periodically. Next, the RFID module 314 (FIG. 3) continues to listen for an RFID transmission as represented by arrow 260, and, if an RFID transmission is received, the algorithm 230 restarts at block 250.

If the processor module 300 (FIG. 3) determines the PAD 130 is exiting an area of interest, the state change algorithm 230 follows arrow 262 to block 268, which represents changing the operating state from the armed or active state to the disarmed or inactive state. Next, the RFID module 314 (FIG. 3) continues to listen for an RFID transmission from an RFID reader, and, if an RFID transmission is received, the state change algorithm 230 restarts at block 250.

Referring now to FIG. 3, the PAD 130 has an RFID module 314 for receiving an RFID transmission from an RFID reader located at or near a portal to an area of interest. In one example, an RFID reader is disposed in a portal of a high risk facility such as a chemical processing plant. Alternatively, an RFID reader is disposed at a portal of a facility through which all personnel travel when arriving and departing from the facility. As the user carries the PAD 130 in proximity of the RFID reader, the RFID module 314 communicates an information signal 114 (FIG. 1) to the processor module 300 indicating the presence of the exterior RFID reader. The processor module 300, running the state change algorithm 230 (described above with reference to FIG. 2B) stored in the memory 302, controls the power supply 312 of the PAD 130 and transitions the PAD 130 from an armed state to a disarmed state. In the disarmed state, only necessary PAD 130 components are powered-on. For example, in the disarmed state the RFID module 314 is continuously "listening" for RFID transmissions from exterior RFID readers in order to cause the PAD 130 to transition from a disarmed state to an armed state.

In an alternate embodiment, the RFID module 314 of the PAD 130 has an RFID reader, which communicates the nearby presence of an identified RFID transceiver to the processor module 300. The processor module 300 causes the PAD 130 to change states from disarmed state to armed state or vice-versa. However, in some applications transmission from an RFID transceiver may be impractical. In such an environment, the RFID module 314 has an RFID receiver but no transmitter and a communication module 310 embodiment that has a transmission receiver but no transmitter is preferred.

In yet another alternate embodiment, multiple RFID readers are disposed in a progression in a portal or passageway to an area of interest such that when entering the portal a first RFID transmission is received by the RFID module 314 before a second RFID transmission, distinguishable from the first RFID transmission. The RFID module 314 communicates RFID signals corresponding to the first and second RFID transmissions to the processor module 300, which determines, based on the order of receiving the RFID signals, whether the PAD 130 is entering or exiting an area of interest (as discussed regarding block 254 of FIG. 2B above and the discussion regarding FIG. 5 below).

While the PAD 130 is in an armed state, the communication module 314 is powered-on and "listens" for a wireless transmission from the wireless transmission system 106 (FIG. 1) (in an alternating fashion as described regarded the sleeping/listening modes above). In one embodiment, the wireless transmission 132 (FIG. 1) is an encoded message delivered in the POCSAG protocol, which is a paging protocol defined by the Post Office Code Standardization Advisory Group. The wireless transmission 132 includes information indicating alarm, test, and location of detector 100 actuation.

With reference to both FIGS. 1 and 3, if the communication module 314 receives a wireless transmission 132 from the wireless transmission system 106, it sends a communication signal to the processor module 300, which processes the communication signal and initiates appropriate annunciation.

Typically, primary annunciation is provided by the ENS 102, which includes a detector network 102, RTUs 110, a central server 116, and alarm indicators 128 such as speakers, horns, lights, screens and the like as discussed with reference to FIG. 1 above. The PAD 130 provides compensatory annunciation, which means that the PAD 130 supplements the annunciation provided by an already existing notification system. The PAD's 130 annunciation module 318 includes a display module 304, a speaker module 306, and a vibration module 308, which are all connected to the power supply 312 and the processor module 300.

When the processor module 300 receives a communication signal from the communication module 310 it initiates the PAD's 130 compensatory annunciation by activating the appropriate components of the annunciation module 318. In one embodiment, the PAD's 130 compensatory annunciation includes concurrent vibration, visual display such as LED display indicating location of detector 100 actuation, and audible sound alarm reaching a minimum of 85 dB.

For example, if the processor module 300 receives a communication signal indicating a detector 100 in building four (4) was actuated, the processor module 300, based on firmware algorithms, sends a display signal to the display module 304 controlling the display module 304 to display the number four (4) or oh-four (04) depending on the type of display. Furthermore, the processor module 300 sends a speaker signal to the speaker module 306 controlling the speaker to sound an alarm indicating a detector 100 actuation. Finally, the processor module 300 sends a vibration signal controlling the vibration module 308 to vibrate. In other embodiments, the processor module 300 sends appropriate annunciation signals to different combinations of the annunciation components (304, 306, and 308) based on the location of the PAD 130 as determined by the RFID module 314.

Figure 4A:
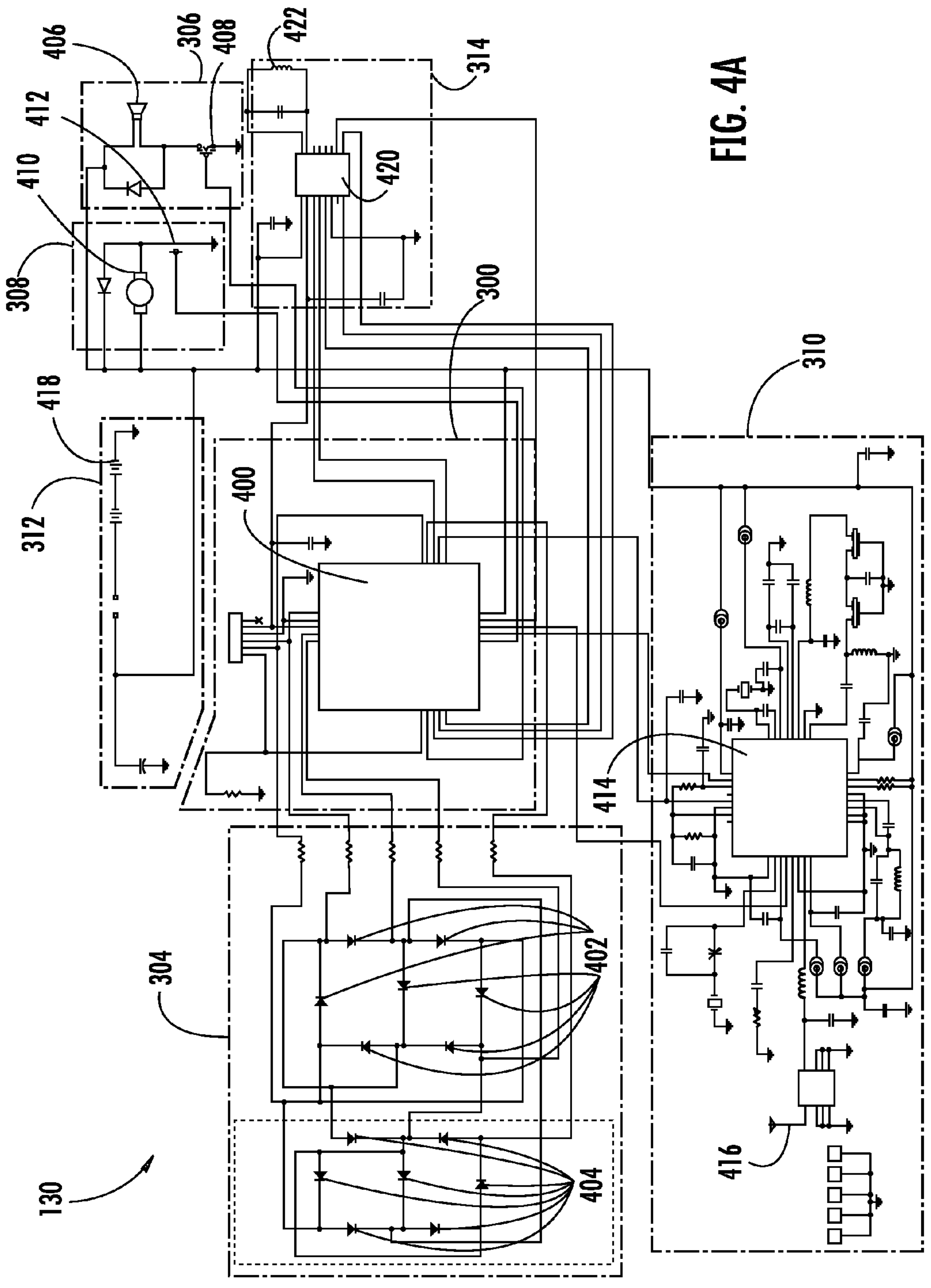
FIG. 4A is a circuit diagram of one embodiment of a PAD according to the disclosure.
Figure 4B:
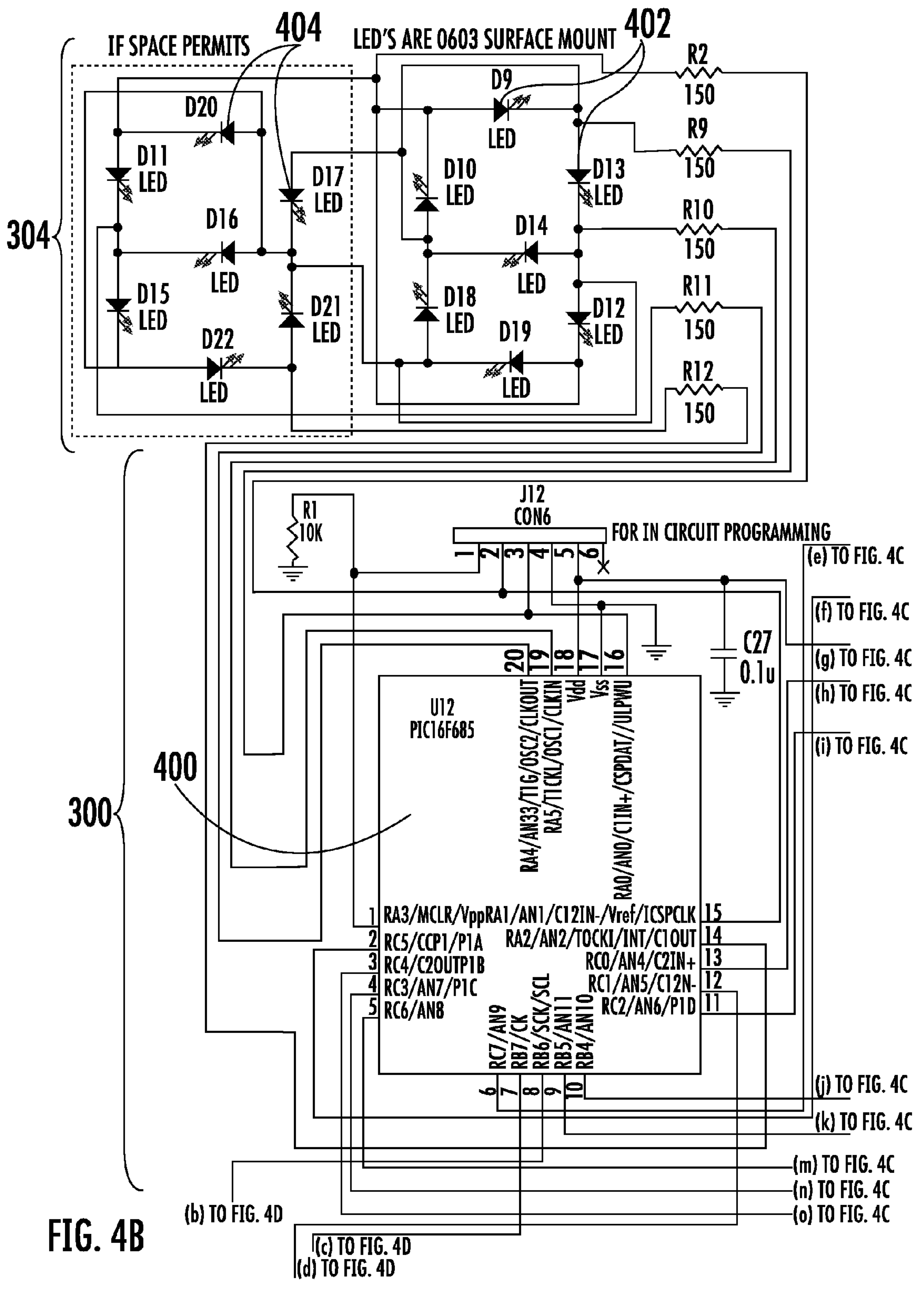
FIG. 4B is a circuit diagram of one embodiment of the processor module and display module of the PAD according to the disclosure.
Figure 4C:
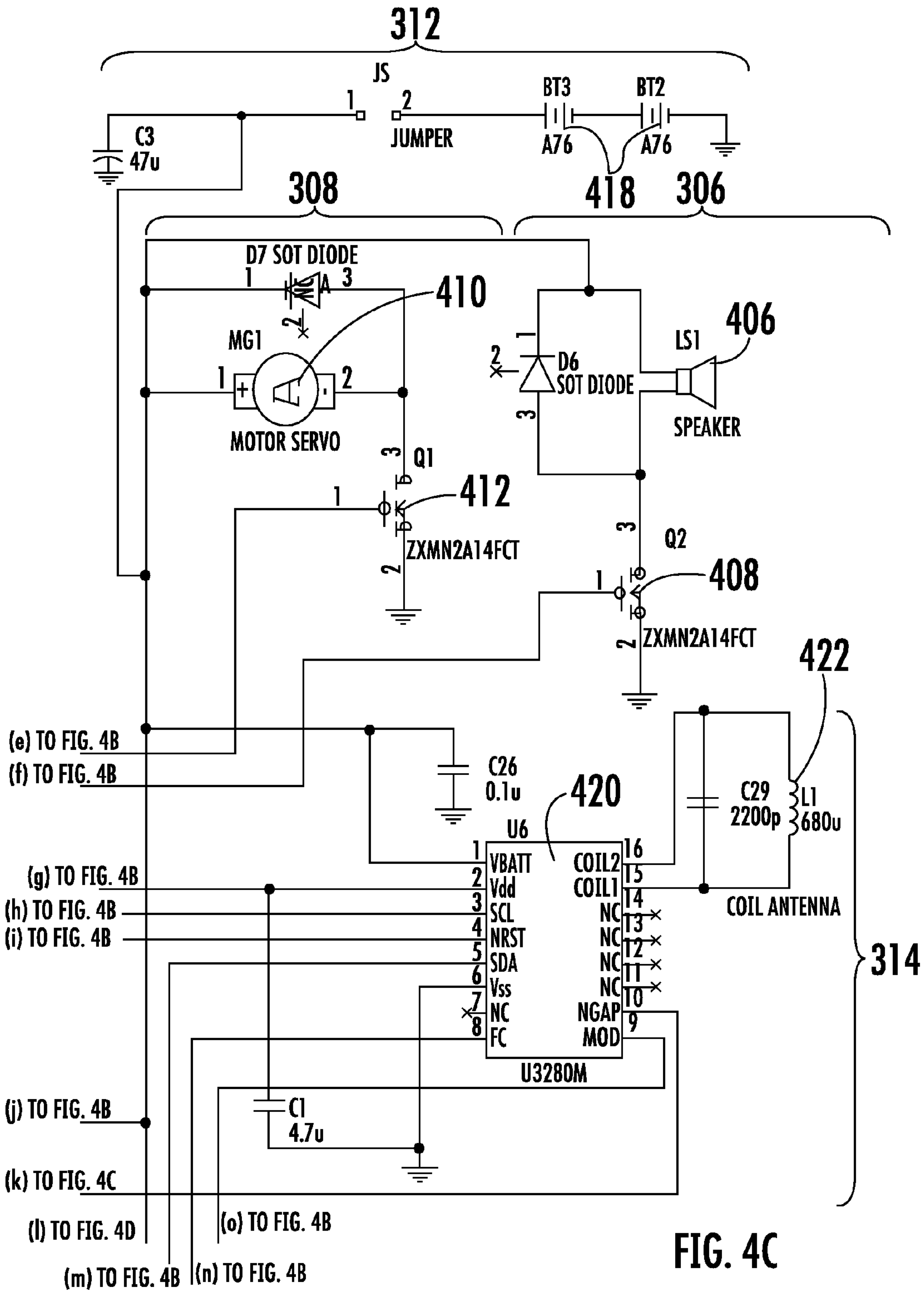
FIG. 4C is a circuit diagram of one embodiment of the speaker module. the vibration module, the power supply and the RFID module of the PAD according to the disclosure.
Figure 4D:
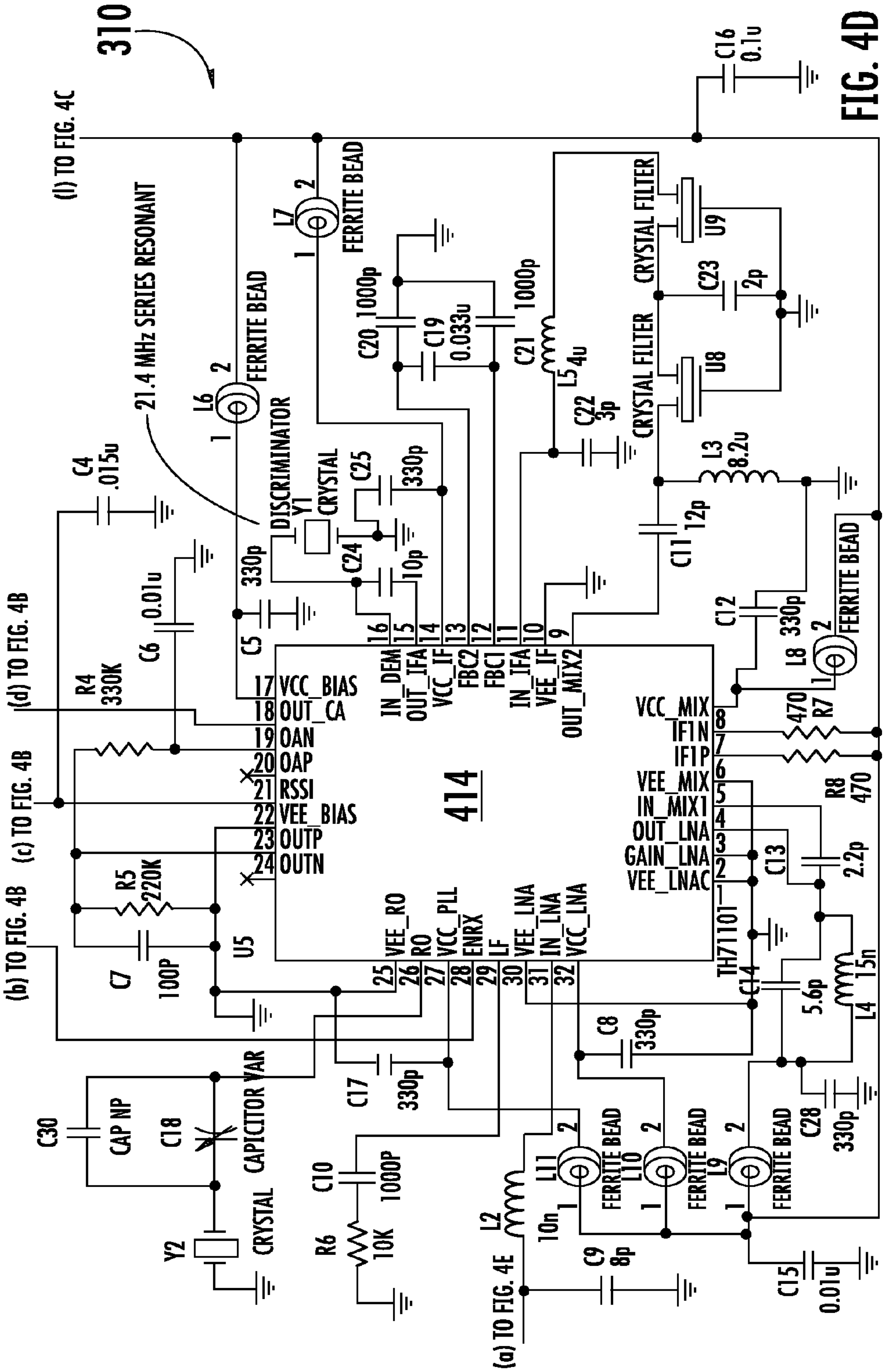
FIG. 4D is a circuit diagram of one embodiment of the communication module of the PAD according to the disclosure.
Figure 4E:
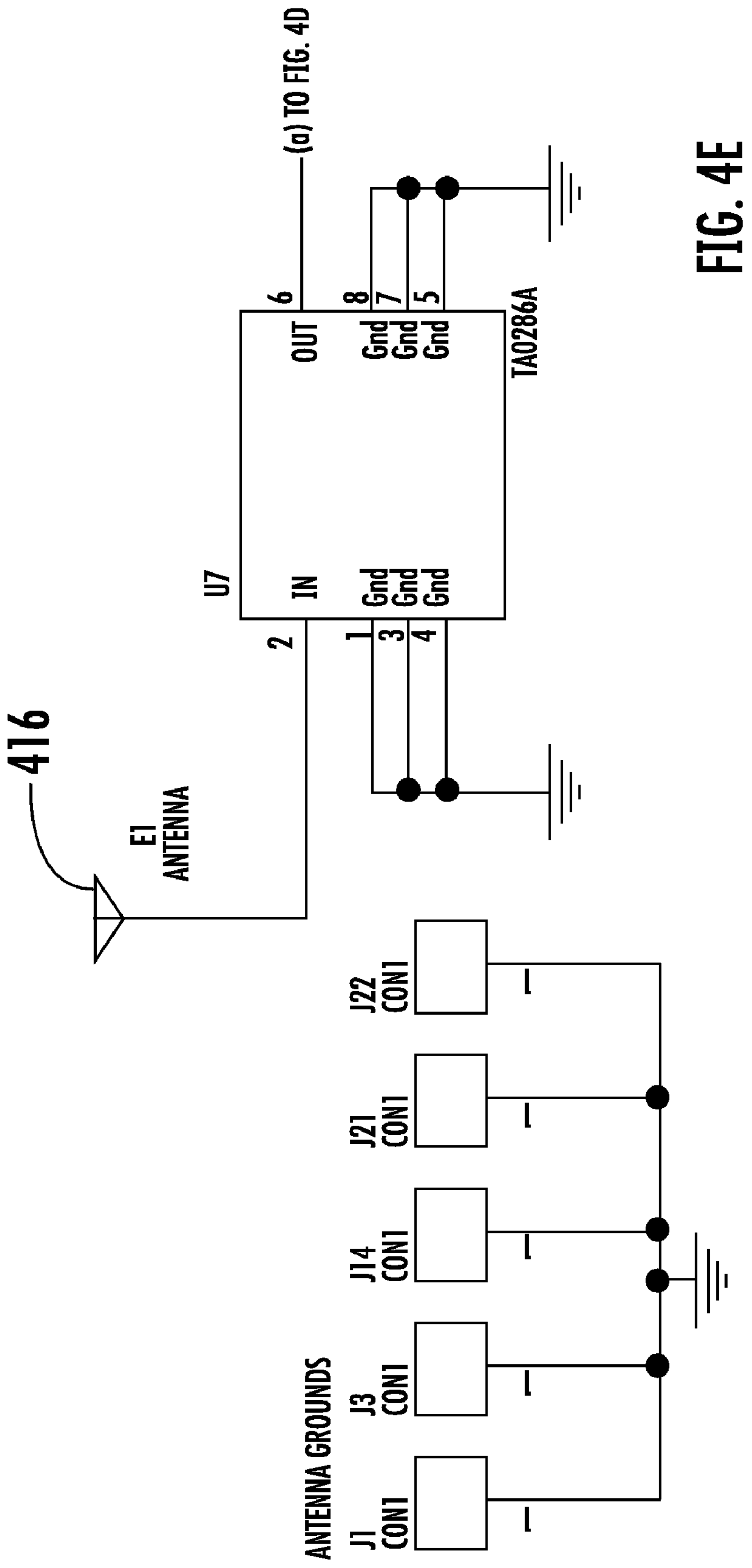
FIG. 4E is a circuit diagram of one embodiment of the antenna of the communication module of the PAD according to the disclosure.

Referring now to FIGS. 4A through 4E (collectively referred to as FIG. 4), circuit diagrams illustrating one embodiment of the PAD 130 are shown. FIG. 4A is a circuit diagram of the entire PAD circuit, and FIGS. 4B through 4E are circuit diagrams of the various modules of the PAD. Each of FIGS. 4B through 4E includes connection references indicating the correlating connection points on the other figures. For example, as indicated on FIG. 4B, pin 6 of processor 400 is connected to "(e)" of FIG. 4C. As shown on FIG. 4C, "(e)" is connected to pin 1 of switch 412. The processor module 300 includes the processor 400, which, in this embodiment is a PIC16F685 microcontroller manufactured by Microchip Technology Inc. of Chandler, AZ. As discussed with regard to FIG. 3, the processor module 300 is connected to each of the other components of the PAD 130. In some embodiments. and as shown in FIG. 4, the memory 302 (FIG. 3) is incorporated into the processor module 300. The PIC16F685, for example, has an on-board EEPROM data memory.

The display module 304 includes a plurality of light emitting diodes (LEDs) 402 configured to display a single digit or alpha-numeric code. In some embodiments, the display module 304 includes a second plurality of LEDs 404 configured to display a second single digit, numeral or alpha-numeric code. Thus, two digits or numerals are displayed simultaneously expanding output of the display module 304 from singular or ones digits to double or tens digits. Alternatively, the display module 304 may be a liquid crystal display (LCD) for displaying digits, the PAD state (whether armed or disarmed, which in one embodiment is indicated by "ON or "OFF" respectively), self-checking status, the location of the detector actuated, or additional annunciation information such as evacuation instructions. The speaker module 306 includes a speaker 406 and a switch 408 for activating the speaker 406 when the processor module 300 sends a speaker signal to activate the speaker 406. Similarly, the vibration module 308 includes a vibration device 410 such as a servo motor and a switch 412 for activating the vibration device 410.

The RFID module 314 includes an RFID receiver 420, which may be a U3280M transponder to microcontroller interface, manufactured by the Atmel Corporation with corporate headquarters in San Jose, Calif. The RFID module 314 also includes an antenna 422 connected to the RFID receiver 420. The RFID receiver 420 recognizes the presence of RFID readers disposed at or near the threshold or portal of any area of interest. As discussed above, the RFID receiver 420 determines the nature of any RFID transmission received and communicates an RFID signal to the processor module 300. The RFID signal indicates identification of the RFID transmission received from the RFID reader. The processor 400 receives the RFID signal and runs the state change algorithm 230 (FIG. 2B), which effectuates a state change if necessary. In other embodiments, multiple RFID readers are disposed in a portal, for example, a corridor leading to and from an area of interest, and the RFID receiver 420 distinguishes the RFID transmissions from a first RFID reader and a second RFID reader. Alternatively, the RFID receiver 414 receives transmissions from RFID readers and communicates RFID signals corresponding to the received transmissions to the processor 400, which runs the state change algorithm 230 or a variant that incorporate multiple RFID transmissions and determines the state in which the PAD 130 should be operating.

The power supply 312 of the PAD 130 includes a voltage source 418, which is an embedded battery in some embodiments. The power supply 312 is enclosed within the PAD 130 so that a user cannot replace the battery or other power source of the power supply 312. This placement reduces the maintenance necessary for a PAD 130 as well as reducing the amount of user interaction associated with the PAD 130. Reducing the amount of user interaction associated with the PAD 130 is desired because it minimizes the opportunity for a user to introduce potential problems to the PAD 130. For example, if the user is required to replace a battery in the power supply 312 of a PAD 130, the task may be postponed because of procrastination or may be performed in error, both resulting in an ineffective compensatory annunciation device.

When power supply 312 is battery-based the battery inherently requires maintenance or replacement, and therefore the PAD 130 includes a self-checking algorithm for power supply 312 strength, referred to as the power supply algorithm. The power supply algorithm is performed by the processor 400 at predetermined times or intervals. For example, in one embodiment, every time the PAD 130 switches states (armed and unarmed) and/or modes (listening and sleeping), the power supply algorithm is performed. Further, the power supply algorithm is run at periodic, predetermined time intervals to ensure the PAD 130's power level is at or above a predetermined threshold, which, in combination with a transmission signal algorithm test described later, indicates that the power supply 312 has at least enough power to annunciate properly if a wireless transmission 132 instructs it to do so. If the power level or battery level is below the predetermined threshold, the processor 400 initiates a power supply alarm, which is an annunciation similar to an event detection annunciation and may include annunciation from any combination of the annunciation components 304, 306, and 308. For example, as the PAD 130 is carried by a user through a threshold of an area of interest, the processor 400 performs the power supply algorithm in order to ensure sufficient power level in the PAD 130 power supply 312. If the power level is below the predetermined threshold, a power supply alarm is initiated. In one embodiment, the low power annunciation includes audible, vibration, and visual alarms easily distinguishable from an event detection or abnormal condition annunciation.

A test state is another state separate from the disarmed state and the armed state and is the result of a communication from the transmission interface 124 (FIG. 1) initiating a PAD 130 test state. The PAD 130 test state includes performing the power supply algorithm as well as a transmission signal algorithm. The transmission signal algorithm is a software algorithm stored in the memory 302 (FIG. 3) of the PAD 130 as part of its firmware. The transmission signal algorithm performs a test of whether the communication module 310 is within signal range of the transmission interface 124 of the wireless transmission system 106 (FIG. 1). This test is made to determine whether transmission signal strength from the wireless transmission system 106 is at or above a threshold transmission signal strength, which, in combination with the power supply algorithm test described earlier, indicates that the PAD 130 will annunciate properly if a wireless transmission 132 instructs it to do so. The test state may be initiated periodically by the central server 116, manually by the user of the PAD 130, and/or manually by personnel interfaced to the central server 116 or transmission terminal RTU 120 (FIG. 1) in order to test the operation of some or all PADs 130 in the network.

The transmission signal algorithm, like the power supply algorithm, is performed automatically on switching states, and in some embodiments' modes, periodically at a predetermined time interval. In others, the transmission signal algorithm is performed substantially continuously to avoid personnel presence in a "dead zone" of the ENS 104. Similarly, in some embodiments, the power supply algorithm is performed substantially continuously in order to avoid low power. In alternate embodiments, the frequency with which the transmission signal algorithm and/or the power supply algorithm are performed is determined based on the previous operation of the algorithms. That is, feedback is used by the processor 400 to determine the frequency of the algorithms.

For example, if a previous iteration of the transmission signal algorithm determined that the strength of the wireless transmissions 132 are above but near a predetermined threshold signal strength that would require a low signal annunciation, the signal algorithm is performed at more frequently than if a previous iteration determined a high strength of wireless transmissions 132. If the signal algorithm determines little or no signal strength from the transmission interface 124, the processor 400 initiates a low signal annunciation, which, similar to the low power annunciation, remains activated for the duration of the low signal. In the case of a low power annunciation, the annunciation remains activated until the PAD 130 is deactivated, for example by going into a disarmed state or a sleeping mode (communication module only in most embodiments). In the case of a low signal annunciation, the annunciation continues until the PAD 130 is carried into an area where signal strength is sufficient to overcome the predetermined threshold signal level.

The continuous annunciation in instances where a low transmission signal from the wireless transmission system 106 or a low battery is detected motivates the user to remedy the problems either by leaving an area of interest during a low power annunciation or entering an area of higher signal strength during a low signal annunciation. Alternatively, annunciation in the event of a low power or low signal determination is initiated and periodically recommenced. This is a useful embodiment in the case where a user is unable to immediately vacate a location or move to a different location. However, the repeating annunciation is sufficient to cause a user to be ever-aware of the necessity of remedying the low power or low signal status of the PAD 130.

When a low power annunciation is initiated, the user is instructed to return the PAD 130 to a predetermined location for replacement with a fully functional PAD 130. For example, a supply of fully functional PADs 130, that is, PADs 130 recently tested for sufficient battery strength, is stored at the threshold or portal of an area of interest. Preferably, the supply of PADs 130 is located outside the range of RFID transmitter(s) disposed in or near the portal in order to minimize power-up and power-down cycles for the PADs 130 held as the reserve supply. Also preferably, a disposal bin is located near the PAD 130 supply so that a low power PAD 130 may easily be collected and subsequently refurbished.

Referring back to FIG. 4, the communication module 310 includes a transmission receiver 414, which may be a TH71101 receiver available from Melexis USA of Concord, N.H. The communication module 310 also has an antenna 416 for receiving radio frequency communications in the range of 300 MHz to 450 MHz.

One characteristic of the PAD 130 is its lack of interface for user input in some embodiments. Similar to the minimization of user maintenance regarding the power supply 312, the PAD 130 does not have a user interface. The lack of user interface reduces the amount of necessary user input. This is beneficial because the PAD 130 is an automatically activated compensatory annunciation device rather than a user-activated annunciation device. Thus, the user cannot power-down the PAD 130 or otherwise thwart, intentionally or unintentionally, the proper function of the PAD 130. However, in other embodiments, the PAD 130 includes a limited user interface that, for example, provides for entering a user identification code associated with the user. This user identification code is communicated by the RFID reader receiving the user identification code to the base station 606 (FIG. 6) in order that the location of the user may be determined as further discussed below with reference to FIG. 6.

Figure 5:
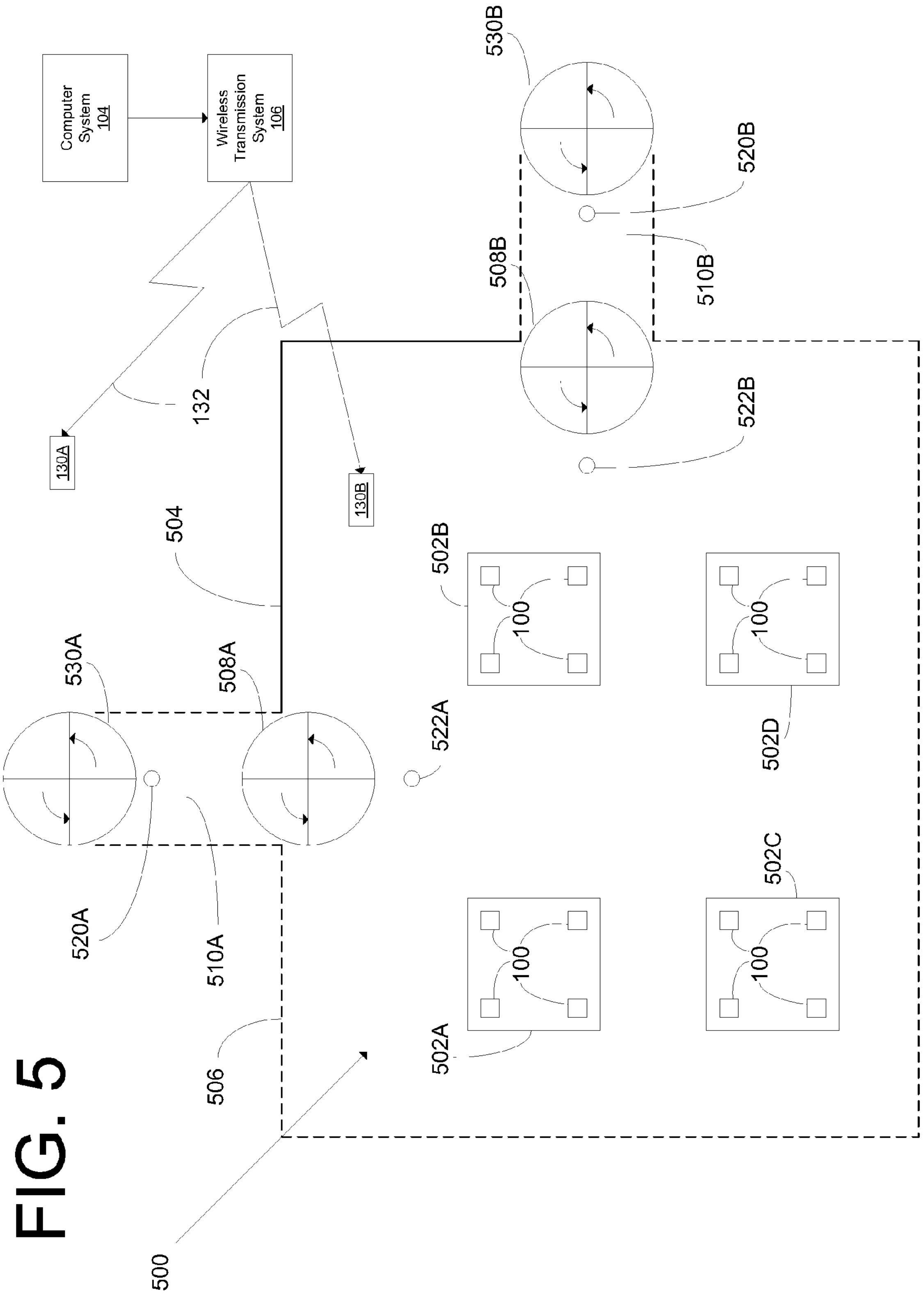
FIG. 5 is a diagram showing an area of interest including a plurality of buildings.

Referring now to FIG. 5 for additional discussion regarding a PAD switching from a disarmed state to an armed state and vice versa, a diagram showing an area of interest 500 encompassing a plurality of buildings 502 and enclosed partially by a wall 504 and partially by a fence 506 is illustrated. Each building 502 has one or more detectors 100, which may be disposed throughout the buildings 502 in order to build a detection network 102 (FIG. 1). In this embodiment, the area of interest 500 is entered and exited by personnel through revolving doors 508A and 508B. On the exterior of doors 508A and 508B are corridors 510A and 510B. The doors 508A and 508B as shown in FIG. 5 are revolving doors, but in other embodiments, other types of doors are used. Corridors 510A and 510B are walkways encompassed by fences or walls in some embodiments.

With continued reference to FIG. 5, and as discussed above with reference to FIG. 1, a computer system, such as an ENS 104, or including an ENS 104, communicates a transmission input signal 118 (FIG. 1) to the wireless transmission system 106, which transmits wireless transmissions 132. The wireless transmissions 132 are received by PADs 130 located within the transmission range. PAD 130A is located outside the area of interest 500, and upon receiving the wireless transmission 132, does not annunciate. In other words, a PAD 130 does not respond to a wireless transmission 132 by annunciation or other response if the PAD 130 is located outside the desired response area, such as the area of interest 500. However PAD 130B, located within the area of interest 500 defined by the wall 504 and the fence 506 annunciates upon receiving a wireless transmission 132 indicating the necessity of annunciation. In order to do so, PAD 130B must be in the armed state and be in listening mode as discussed with reference to FIG. 2B above.

Method decision step 254 (FIG. 2B) is performed in some embodiments using multiple RFID readers disposed at distinct locations in a portal, such as the corridors 510A and 510B to an area of interest 500. In the embodiment shown in FIG. 5, first RFID readers 520A and 520B are disposed at a location removed from the area of interest 500 relative to second RFID readers 522A and 522B, which are disposed closer to the area of interest 500 than the first RFID readers 520A and 520B. In some embodiments, such as that of FIG. 5, the second RFID readers 522A and 522B are disposed within the area of interest 500 near the doors 508A and 508B.

With combined reference to FIG. 5, FIG. 3, and FIG. 2B, as a PAD 130 enters an area of interest 500 through a portal such as the corridor 510A of FIG. 5 it passes first RFID reader 520A. Upon receiving an RFID transmission from first RFID reader 520A, the RFID module 314 (FIG. 3) of the PAD 130 sends an RFID signal to the processor module 300, which instructs the RFID module to listen for an RFID transmission from a second RFID reader 522A. When an RFID transmission from the second RFID reader 522A is received by the RFID module 314 it sends a corresponding RFID signal to the processor module 300 (FIG. 3). The processor module 300 performs step 254 of FIG. 2B, which is determining whether the PAD is entering or exiting an area of interest. In one embodiment, the processor module 300 receives an RFID signal indicating the PAD 130 passed in proximity to a first RFID reader 520A, and the processor module 300 instructs the RFID module 314 to listen for a second transmission from a second RFID reader 522A for a predetermined amount of time, for example, thirty (30) seconds. Thus, if the RFID module 314 receives a transmission from a second RFID reader 522A within the predetermined time limit, the processor module 300 determines the PAD 130 is entering an area of interest 500 and moves to step 258 of FIG. 2B, which is changing the operating state of the PAD 130 from an armed state to a disarmed state.

Once the PAD 130 is in an armed state, the processor module 300 instructs the RFID module 314 to listen for an RFID transmission from a first RFID reader 520A. When such a transmission is received by the RFID module 314, the processor module 300 determines the PAD is exiting an area of interest 262 (FIG. 2B) and changes the operating state from an armed state to a disarmed state as represented by block 268 of FIG. 2B. In some embodiments, the RFID module 314 does not listen for particular RFID transmissions, but rather, any transmission within its range, and communicates a corresponding RFID signal to the processor module 300 indicating the nature of the RFID transmission. In these embodiments, the processor module 300 determines whether the RFID transmission was initiated by a first RFID reader 520 or a second RFID reader 522 or neither and performs the state change algorithm of FIG. 2B accordingly.

In other embodiments, only one RFID reader is used at each portal (e.g., 520A and 520B). In these embodiments, the RFID module 314 of the PAD 130 listens for a transmission from an RFID reader 520A or 520B and sends a corresponding RFID signal to the processor module 300. Once the RFID module 314 loses the RFID transmission from RFID reader 520A or 520B for a predetermined period of time, for example thirty (30) seconds, if the PAD 130 is in the armed state the processor module 300 changes the operating state of the PAD 130 from an armed state to a disarmed state as represented by block 268 of FIG. 2B. In order for such an operating state change operation to be accurately performed, care must be taken in designing the portal entering an area of interest 500. For example, a problem could occur if a user brought a PAD into range of a first RFID reader 520A or 520B and subsequently left without entering the area of interest 500. In such a case, the processor module 300 waits the predetermined time period and enters an armed state. This result is undesirable, and therefore, the portal must be physically constructed in order to ensure that the PAD 130 only receives an RFID transmission when entering the area of interest 500. This is accomplished in one embodiment by locking outer door 530A or 530B once a user is inside portal or corridor 510A or 510B, respectively. Thus, the user must enter door 508A or 508B and the area of interest 500. Any configuration for insuring the user enters the area of interest 500 upon the PAD receiving the RFID transmission from RFID reader 520 may be used.

In this one RFID reader embodiment, once inside the area of interest 500 and in an armed state, the processor module 300 changes the operating state from an armed state to a disarmed state upon the PAD 130 exiting the area of interest 500. The processor module 300 performs this step upon receiving an RFID signal from the RFID module 314 indicating passing the RFID reader 520A or 520B as the user exits the area of interest 500. Thus, upon entering through a portal to an area of interest, the PAD receives a transmission from an RFID reader and changes operating states from a disarmed state to an armed state and upon exiting through the same or another portal to the area of interest, the PAD receives a transmission from an RFID reader and changes operating states from an armed state to a disarmed state.

In another embodiment, the revolving doors 508A, 508B, 530A and 530B could be configured as exclusively either entrances or exits. So, doors 508A and 530A could be an entrance and doors 508B and 530B could be exits. If the PAD 130 encounters RFID readers 520A or 522A, it responds by switching to the armed state, and if PAD 130 encounters RFID readers 520B or 522B, it responds by switching to the armed state. Alternatively, if the PAD 130 encounters both RFID readers 520A and 522A within a selected time period, it responds by switching to the armed state, and if PAD 130 encounters both RFID readers 520B and 522B within a selected time period, it responds by switching to the armed state. In yet another alternative, the states are switched only if the RFID readers are encountered in a certain order. For example, if the PAD 130 encounters RFID readers 520A and then 522A, it responds by switching to the armed state, and if PAD 130 encounters RFID readers 520B and then 522B, it responds by switching to the armed state.

Figure 6:
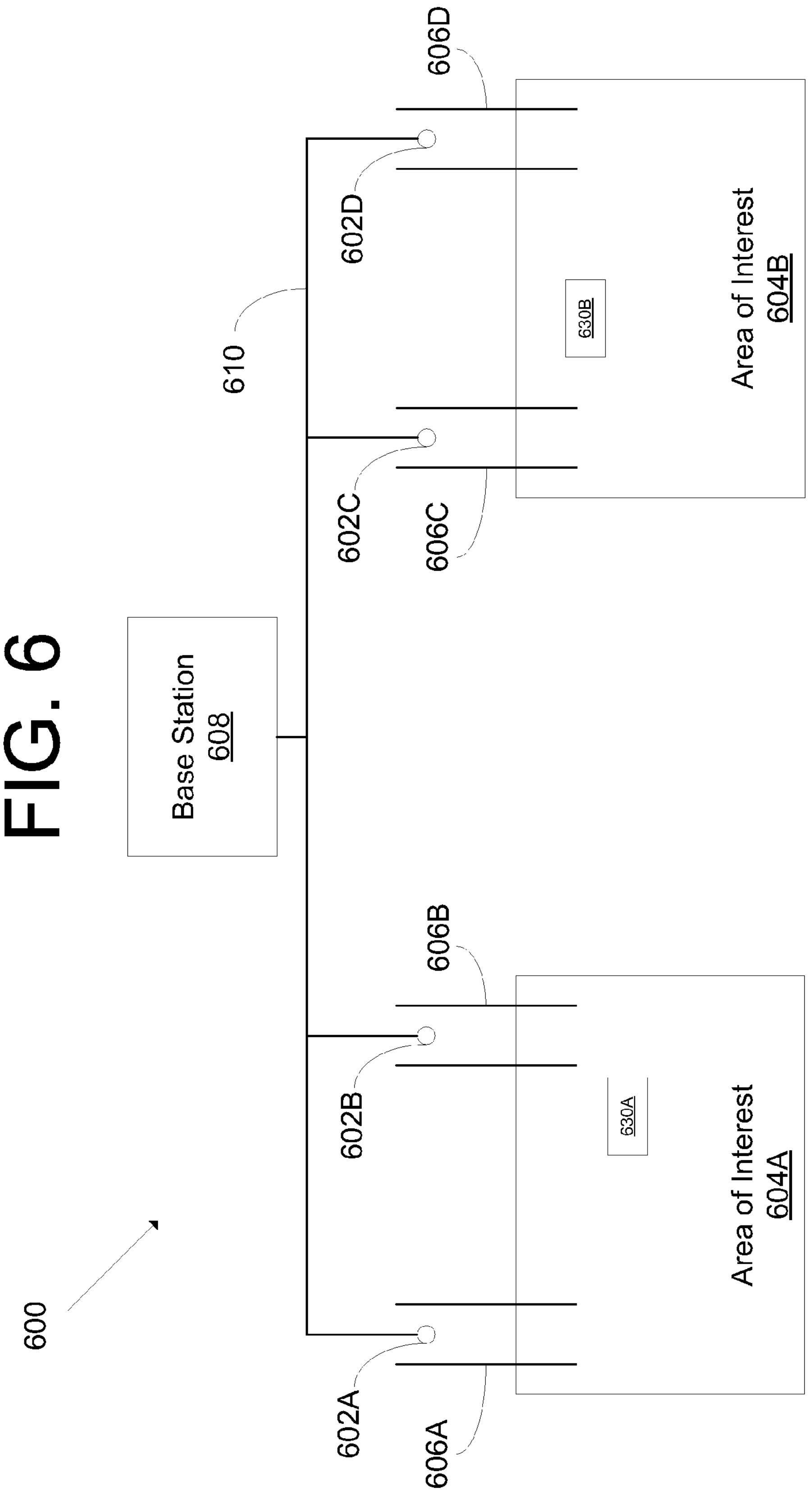
FIG. 6 is a diagram of an accountability network including a plurality of RFID readers operatively connected to a base station.

Referring now to FIG. 6, another embodiment of an ENS 600 is shown wherein the ENS 600 includes an accountability network 600 that provides information concerning the location of personnel by accounting for the location of individual PADs 130 as they enter and/or exit areas of interest 604. Multiple RFID readers 602, also discussed with reference to FIG. 5 above, are disposed in portals 606 into and out from areas of interest 604. In the embodiment shown in FIG. 6, portal 606A is an entranceway to area of interest 604A and portal 606B is an exit out of area of interest 604A. RFID reader 602A is disposed in or near portal 606A and RFID reader 602B is disposed in or near portal 606B. Similarly, portal 606C is an entranceway to area of interest 604B and portal 606D is an exit out of area of interest 604B. RFID reader 602C is disposed in or near portal 606C and RFID reader 602D is disposed in or near portal 606D.

In some embodiments, each RFID reader is operatively connected, either via hardwire or wirelessly as represented by dotted line 610, to base station 608 forming the accountability network 600. Each PAD 630 has an identification number associated with it and stored in its memory. Also, the base station has a database including each of the PAD identification numbers. This database, in some embodiments, also includes cross references to the individual to which each PAD 630 is assigned. Thus, by implication, each identification number is associated with an individual user of a PAD 630. For example, PAD 630A, which is located within area of interest 604A in FIG. 6, is assigned identification number (630A). The identification number is stored in the memory of PAD 630A, in some embodiments in its firmware. In some embodiments, the identification number is also stored in a database at the base station 608. In some embodiments, the identification number is cross-referenced with the name of the individual assigned to the specific PAD. That is, if John Doe is assigned to PAD 630A (with identification number 630A), the database of the base station includes an entry having PAD 630A associated with John Doe. In other embodiments, the user enters a user identification code into a user interface on the PAD 630 as discussed above. The user identification code is communicated across the accountability network 600 to the base station 608 in order that the location and identification of the user may be determined.

The accountability network 600 has the capability of indicating to the base station 600 the location of any specific PAD 630, and in some embodiments, the location of the individual user to which each specific PAD 630 is assigned. As a PAD 630 passes through an area of interest entranceway portal, such as 606A and 606C, the RFID reader, such as 602A and 602C, transmits an RFID transmission to the PAD 630, which self-arms as discussed above. The RFID module 314 (FIG. 3) of the PAD 630, in some embodiments, is able to transmit identification information to the RFID reader 602.

Thus, as the PAD 630A enters an area of interest 604A through an entranceway portal 606A and passes an RFID reader 602A, the RFID reader 602A communicates an RFID transmission to the RFID module of the PAD 630, which self-arms, and the RFID module 314 of the PAD 630A communicates an identification signal to the RFID reader 602A. The RFID reader 602A then communicates a remote identification signal to the base station 608, which processes the remote identification signal and determines the identification of the PAD 630A. The remote identification signal also includes information indicating the identification of the RFID reader, 602A in this example. The base station 608 processes the identification of the RFID reader 602A in order to infer the location of the specific PAD 630A and its user.

In this example, the base station 608 receives the remote identification signal, processes it, and determines that the PAD with identification number (630A) passed RFID reader 602A, which indicates that PAD 630A is inside area of interest 604A. Similarly, when PAD 630A exits area of interest 604A through portal 606B and passes RFID reader 602B, PAD 630A self-disarms as discussed above and communicates an identification signal to RFID reader 602B. RFID reader 602B communicates a remote identification signal including information corresponding to the identification signal received from the PAD 630 and information indicating the identification of itself, that is, the RFID reader 602 communicating the remote identification signal.

In other embodiments, the RFID reader 602 recognizes the identification of each specific PAD almost immediately. That is, the PAD 630 RFID module 314 is continuously or periodically transmitting an RFID transmission indicating its presence and its identification. The RFID reader 602, upon receiving such an RFID transmission, communicates a state change instruction to the PAD, instructing the PAD to perform a state change algorithm. In some embodiments, the state change instruction includes information indicating whether the PAD 630 is entering or exiting an area of interest 604 and in other embodiments, the state change instruction is merely an instruction for the PAD to change states from the state in which it is currently operating. In other words, if the PAD receives a state change instruction from an RFID reader 602, the PAD changes from a disarmed state to an armed state or from an armed state to a disarmed state. In these embodiments, the RFID reader 602 communicates a remote identification signal to the base station 608 including the identification information of the PAD 630 and the RFID reader 602, which indicates the location of the PAD and, in some embodiments, its assigned user.

Such accountability of personnel is especially useful if an emergency situation arises because the whereabouts of an individual with a particular PAD 630 is stored in the database of the base station 608. Thus, if an emergency occurs within an area of interest 604, rescue personnel can account for each individual who was present within the area of interest easily by referencing the database of the base station 608. In other embodiments, the RFID module 314 (FIG. 3) of the PAD 630 has an "active" RFID tag, which automatically communicates the identification of the PAD 630 to potential RFID readers 602. Such embodiments alleviate the necessity of storing the PAD 630 identification number in the memory of the PAD 630, for example in the firmware. However, storing the identification number of the PAD 630 in the firmware does not require significant storage space and is easily implemented.

In some embodiments of the accountability network 600 shown in FIG. 6, the remote identification signal includes information in addition to the identification of the PAD 630 passing the reader 602 and the identification of the reader 602. In some embodiments, the additional information includes the time the PAD 630 passed the reader 602. This allows the base station 608 to determine what time an individual entered or exited an area of interest 604 and the amount of time the individual has been inside or outside of an area of interest 604. Also, the additional information may include the identification of the individual carrying the PAD 630. In this embodiment, the PAD 630 is programmed to include the name of the individual or an identification number associated with the individual such as an employee number.

The foregoing description of preferred embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. An emergency notification system (ENS) for annunciating in an area of interest in a presence of an abnormal condition in a hazardous area, the ENS comprising:

(a) a detection network configured for detecting an abnormal condition in a hazardous area and producing an information signal indicating the presence of the abnormal condition, and configured for processing the information signal and communicating a transmission input signal based at least in part on the information signal;

(b) a transmission terminal configured for receiving the transmission input signal and for communicating a transmission control signal based at least in part on the transmission input signal and recognition of detector alarm states for detectors deployed in specific locations;

(c) a transmission interface configured for receiving the transmission control signal from the transmission terminal and transmitting a wireless transmission based at least in part on the transmission control signal;

(d) a personal annunciation device (PAD) configured for self-arming into an armed state when moving into the area of interest and self-disarming into a disarmed state when moving out of the area of interest and configured for receiving the wireless transmission and annunciating the presence of the abnormal condition only when located within the area of interest based at least in part on the received wireless transmission and configured for performing a self-check and alerting when located within the area of interest, the PAD having a unique identification for transmittal to a base station when the PAD is transitioned to self-armed and when the PAD is transitioned to self-disarmed; and (e) an RFID reader configured for recognizing the state of the PAD and causing the PAD to self-arm into the armed state when moving into the area of interest and self-disarm into the disarmed state when moving out of the area of interest.

2. The ENS of claim 1 wherein the PAD is configured for receiving an RFID transmission and, in response to the RFID transmission, for switching the PAD between the armed state in which the PAD will annunciate and the disarmed state in which the PAD will not annunciate.

3. The ENS of claim 1 wherein the RFID reader is disposed at a portal of the area of interest for producing an RFID transmission that causes the PAD to switch between the armed state and the disarmed state.

4. The ENS of claim 1 wherein the PAD further comprises a processor module for performing a state change algorithm for switching the PAD into the armed state when the PAD is entering the area of interest and for switching the PAD into the disarmed state when the PAD is leaving the area of interest.

5. The ENS of claim 1 wherein the PAD is configured for receiving first and second RFID transmissions and, in response to the first and second RFID transmissions, for switching the PAD between the armed state in which the PAD will annunciate and the disarmed state in which the PAD will not annunciate.

6. The ENS of claim 1 wherein the PAD is configured for receiving an RFID transmission and, in response to the RFID transmission, for performing a power check to determine whether a power supply is below a threshold and providing an annunciation when the power supply is below the threshold.

7. The ENS of claim 1 wherein the wireless transmission includes test information and the PAD is configured to test its operation in response to the test information and provide a warning annunciation if the PAD is not operating properly.

8. The ENS of claim 1 further comprising an accountability network comprising:

(i) the RFID reader disposed at a portal of the area of interest and for receiving an identification number from the PAD as the PAD enters or exits the area of interest and communicating a remote identification signal; and (ii) the base station operatively connected to the RFID reader for receiving the remote identification signal from the RFID reader and determining accountability information associated with the PAD based at least in part on the received remote identification signal.

9. A personal annunciation device (PAD) for providing, in an area of interest, compensatory annunciation of a presence of an abnormal condition in a hazardous area, the compensatory annunciation being in addition to primary annunciation provided by an emergency notification system (ENS), the PAD comprising:

(a) a housing configured for enclosing the PAD;

(b) a power supply configured inside the housing and configured for providing power to the PAD;

(c) a radio frequency identification device (RFID) module configured for receiving an RFID transmission from an RFID reader defining said hazardous area for performing a self-check and alerting when located within said hazardous area, and for communicating an RFID signal as a response to said RFID reader when in proximity thereto;

(d) a processor module configured for receiving the RFID signal and performing a state change algorithm for switching the PAD between an armed state in which the PAD will annunciate and a disarmed state in which the PAD will not annunciate;

(e) a communication module configured for receiving a wireless transmission indicative of said abnormal condition from a wireless transmission system of said ENS and communicating annunciation information to the processor module based at least in part on the wireless transmission, wherein the processor module is further configured for receiving the annunciation information and communicating a first annunciation control signal based at least in part on the annunciation information; and (f) an annunciation module configured for receiving the first annunciation control signal and for providing an annunciation corresponding to the first annunciation control signal.

10. The PAD of claim 9 wherein the processor module is configured to perform a power supply algorithm test for determining whether the power supply has a capability to provide at least a threshold amount of power and configured to perform a signal transmission algorithm test for determining whether a transmission signal strength from the wireless transmission system has at least a threshold transmission strength, indicating the PAD will annunciate properly.

11. The PAD of claim 9 wherein the annunciation module comprises one or both devices selected from the group consisting of a display module for providing visual annunciation based on the first annunciation control signal and a vibration module for producing a vibration annunciation based on the first annunciation control signal.

12. The PAD of claim 9 wherein the annunciation module comprises an audio module capable of producing an audible annunciation of at least 85 dB based on the first annunciation control signal.

13. The PAD of claim 9 wherein the ENS comprises a plurality of detectors for detecting an abnormal condition in a hazardous area and wherein the annunciation module of the PAD actuates within a minimum time interval of a detection of the abnormal condition by at least one of the detectors.

14. The PAD of claim 9 wherein the RFID module comprises an RFID antenna and an RFID receiver for receiving the RFID transmission.

15. The PAD of claim 9 wherein the processor module comprises a memory for storing firmware for controlling the operation of the processor module and for storing at least the state change algorithm.

16. The PAD of claim 9 wherein the RFID module operates substantially at a frequency of 125 kHz.

17. The PAD of claim 9 wherein the processor module is configured to determine whether a state change is necessary by running the state change algorithm that comprises determining whether the PAD is entering or exiting an area of interest.

18. The PAD of claim 9 wherein the PAD is configured for providing accountability of personnel and the RFID module is configured for transmitting a unique identification number associated with the PAD.

19. The PAD of claim 9 wherein the RFID module is configured to receive first and second RFID transmissions and produce first and second RFID signals, and wherein the state change algorithm and the processor module are Configured;

(a) to arm the PAD to the armed state in which the PAD will annunciate in response to the RFID module receiving the first RFID transmission and then the second RFID transmission, and (b) to switch the PAD to the disarmed state in which the PAD will not annunciate in response to the RFID module receiving the second RFID transmission and then the first RFID transmission.

20. The PAD of claim 19 wherein the PAD is configured to annunciate upon receiving an alarm signal as said wireless transmission that is generated and transmitted by the emergency notification system (ENS) in response to a detection of a hazard, the ENS comprising:

(a) a detection network for indicating the presence of the hazard by communicating a hazard signal, (b) an alarm processing unit connected to the detection network and for receiving the hazard signal and communicating a communication signal, and (c) an alarm transmission system connected to the detection network and for receiving the communication signal and transmitting the alarm signal.

21. A method for providing,. in an area of interest, compensatory annunciation indicating a presence of an abnormal condition in a hazardous area, the compensatory annunciation in addition to primary annunciation provided by an emergency notification system (ENS), the method comprising:

(a) receiving with a personal annunciation device (PAD) a radio frequency identification device (RFID) transmission from an RFID reader disposed in or near a portal of the area of interest;

(b) determining whether the PAD is entering the area of interest based at least in part on the received RFID transmission, and performing a self-check and alerting when located within the area of interest;

(c) changing an operating state of the PAD from a disarmed state to an armed state if the PAD is entering the area of interest; and (d) receiving a wireless transmission with the PAD in the armed state from a paging system of the ENS and providing a compensatory annunciation to the user based on the received wireless transmission.

22. The method of claim 21 further comprising determining whether the PAD is exiting the area of interest based at least in part on the received RFID transmission and changing the operating state of the PAD from the armed state to the disarmed state if the PAD is exiting the area of interest.

23. The method of claim 21 wherein:

Step (a) comprises receiving with the PAD a first radio frequency identification device (RFID) transmission and a second RFID transmission from first and second RFID readers disposed in or near a portal of the area of interest;

Step (b) comprises determining whether the PAD is entering or leaving the area of interest based at least in part on the received first and second RFID transmissions; and Step (d) comprises receiving a wireless transmission with the PAD in the armed state from a wireless communication system of the ENS and providing the compensatory annunciation to the user based on the received wireless transmission and not providing the compensatory annunciation if the PAD is in the disarmed state; and further comprising:

(e) changing the operating state of the PAD from the armed state to the disarmed state when the PAD is leaving the area of interest.

24. The method of claim 21 further comprising the steps of:

(e) communicating to the PAD a PAD identification;

(f) receiving with the RFID reader the PAD identification;

(g) communicating a remote identification signal based at least in part on the PAD identification with the RFID reader; and (h) receiving the remote identification signal at a base station.

* * * * *